(12) United States Patent
Hempstead et al.

(10) Patent No.: US 11,880,463 B2
(45) Date of Patent: Jan. 23, 2024

(54) SYSTEMS AND METHODS FOR THERMAL SIDE-CHANNEL ANALYSIS AND MALWARE DETECTION

(71) Applicants: Trustees of Tufts College, Medford, MA (US); Drexel University, Philadelphia, PA (US)

(72) Inventors: Mark Hempstead, Boston, MA (US); David Werner, Boston, MA (US); Eric Miller, Boston, MA (US); Kyle Juretus, Philadelphia, PA (US); Ioannis Savadis, Philadelphia, PA (US)

(73) Assignees: Trustees of Tufts College, Medford, MA (US); Drexel University, Philadelphia, PA (US)

( * ) Notice: Subject to any disclaimer, the term of this patent is extended or adjusted under 35 U.S.C. 154(b) by 163 days.

(21) Appl. No.: 17/250,973

(22) PCT Filed: Oct. 7, 2019

(86) PCT No.: PCT/US2019/055075
§ 371 (c)(1),
(2) Date: Apr. 5, 2021

(87) PCT Pub. No.: WO2020/073059
PCT Pub. Date: Apr. 9, 2020

(65) Prior Publication Data
US 2021/0349998 A1 Nov. 11, 2021

Related U.S. Application Data

(60) Provisional application No. 62/741,846, filed on Oct. 5, 2018.

(51) Int. Cl.
*G06F 21/56* (2013.01)
*G06F 21/75* (2013.01)

(52) U.S. Cl.
CPC .......... *G06F 21/566* (2013.01); *G06F 21/567* (2013.01); *G06F 21/755* (2017.08)

(58) Field of Classification Search
CPC ..... G06F 21/566; G06F 21/567; G06F 21/755
See application file for complete search history.

(56) References Cited

U.S. PATENT DOCUMENTS

| | | | |
|---|---|---|---|
| 2013/0003438 A1* | 1/2013 | Merkel | G11C 7/04 365/148 |
| 2016/0371485 A1* | 12/2016 | Onabajo | G06F 21/552 |

(Continued)

OTHER PUBLICATIONS

Anonymous. "HotSpot 6.0 Temperature Modeling Tool." Version dated Jul. 7, 2018. Available: https://web.archive.org/web/20180707173104/http://lava.cs.virginia.edu/HotSpot/documentation.htm.

(Continued)

*Primary Examiner* — Nelson S. Giddins
(74) *Attorney, Agent, or Firm* — Quarles & Brady LLP

(57) ABSTRACT

In some embodiments, the present disclosure provides systems and methods for detecting malware, including receiving thermal images of an integrated circuit, and generating a power density profile using at least one of the thermal images. The present disclosure further includes comparing the power density profile to an expected power density profile of the integrated circuit, and determining, based on the comparison, if the integrated circuit is in an abnormal operating state.

20 Claims, 14 Drawing Sheets

(56) References Cited

U.S. PATENT DOCUMENTS

| | | | |
|---|---|---|---|
| 2017/0082680 A1* | 3/2017 | Eck | G06F 21/554 |
| 2018/0219889 A1 | 8/2018 | Oliner | |
| 2018/0314826 A1* | 11/2018 | Mankovskii | G06V 10/761 |
| 2019/0377870 A1* | 12/2019 | Daniel | G06F 21/567 |

OTHER PUBLICATIONS

Atmel. "AVR211 : Wafer level chip scale packages". 2012. Available online: https://web.archive.org/web/20170702034400/http://www.atmel.com/Images/doc42007.pdf.

Brouchier, J., et al. "Thermocommunication." Cryptology ePrint Archive (2009).

Chandola, V. et al., "Anomaly detection: A survey," ACM Comput. Surv., vol. 41, No. 3, pp. 15:1-15:58, Jul. 2009. Available: http://doi.acm.org/10.1145/1541880.1541882.

Chollet F. et al., "Keras." Webpage. https://keras.io, 2015. Available online at https://web.archive.org/web/20151225014321/http://keras.io/.

Cochran, R. et al., "Post-silicon power characterization using thermal infrared emissions," in Proceedings of the ACM/IEEE International Symposium on Low-Power Electronics and Design, Aug. 2010, pp. 331-336.

Coskun, A.K. et al., "Analysis and Optimization of MPSoC Reliability," Journal of Low Power Electronics, vol. 2, No. 1, pp. 56-69, 2006.

Demme, J. et al., "Side-channel vulnerability factor: A metric for measuring information leakage," in Proceedings of the 39th Annual International Symposium on Computer Architecture, ser. ISCA '12. Washington, DC, USA: IEEE Computer Society, 2012, pp. 106-117.

Esmaeilzadeh, H. et al., "Dark silicon and the end of multicore scaling," in Computer Architecture (ISCA), 2011 38th Annual International Symposium on. IEEE, 2011, pp. 365-376.

Hu, K. et al., "High-sensitivity hardware Trojan detection using multimodal characterization," in Proceedings of the Design, Automation Test in Europe Conference, Mar. 2013, pp. 1271-1276.

Huang, W. et al., "Accurate, pre-rtl temperature-aware design using a parameterized, geometric thermal model," Computers, IEEE Transactions on, vol. 57, No. 9, pp. 1277-1288, 2008.

Hutter M. et al., "The temperature side channel and heating fault attacks," in Smart Card Research and Advanced Applications. Springer, 2014, pp. 219-235.

Intel. "Intel Quark SoC X1010 (16k cache, 400 MHz) product specifications." Version dated Feb. 22, 2017. Available: https://web.archive.org/web/20170222072501/http://ark.intel.com/products/80901.

International Searching Authority. International Search Report and Written Opinion for application PCT/US2019/055075, dated Jan. 9, 2020. 7 pages.

Jayasinghe, D. et al., "Advanced modes in aes: Are they safe from power analysis based side channel attacks?" in Computer Design (ICCD), 2014 32nd IEEE International Conference on. IEEE, 2014, pp. 173-180.

Lustig, M. et al., "Sparse MRI: The application of compressed sensing for rapid MR imaging," Magnetic Resonance in Medicine, vol. 58, No. 6, pp. 1182-1195, Dec. 2007. Available: http://onlinelibrary.wiley.com/doi/10.1002/mrm.21391/abstract.

Mao, B. et al., "Quantifying timing-based information flow in cryptographic hardware," in Proceedings of the IEEE/ACM International Conference on Computer-Aided Design (ICCAD), Nov. 2015, pp. 552-559.

Masti, R.J. et al., "Thermal covert channels on multi-core platforms," in Proceedings of the USENIX Security Symposium, 2015, pp. 865-880. Available: https://www.usenix.org/conference/usenixsecurity15/technical-sessions/presentation/masti.

Maxim Integrated. "Understanding Flip-Chip and Chip-Scale package technologies and their applications—application note—Maxim." Version dated Jun. 10, 2017. Available: https://web.archive.org/web/20170610184338/https://www.maximintegrated.com/en/app-notes/index.mvp/id/4002.

Nazari, A. et al., "EDDIE: EM-based detection of deviations in program execution," in Proceedings of the 44th Annual International Symposium on Computer Architecture, Jun. 2017, pp. 333-346. Available: http://doi.acm.org/10.1145/3079856.3080223.

Nikovski D. et al., "Regularized covariance matrix estimation with high dimensional data for supervised anomaly detection problems," in Proceedings of the 2016 International Joint Conference on Neural Networks, Jul. 2016, pp. 2811-2818.

Opencores. "Opencores. Homepage" Version dated Sep. 24, 2018. Available: https://web.archive.org/web/20180924134206/http://opencores.org/.

Reda S. et al., "Blind identification of power sources in processors," in Proceedings of the Design, Automation Test in Europe Conference, Mar. 2017, pp. 1739-1744.

Reda S. et al., "Blind Identification of Thermal Models and Power Sources From Thermal Measurements," IEEE Sensors Journal, vol. 18, No. 2, pp. 680-691, Jan. 2018.

Schafer B.C. et al., "Hotspots elimination and temperature flattening in VLSI circuits," IEEE Transactions on Very arge Scale Integration (VLSI) Systems, vol. 16, No. 11, pp. 1475-1487, Nov. 2008.

Shahzad, F. et al., "Electromagnetic interference shielding with 2d transition metal carbides (MXenes)," Science, vol. 353, No. 6304, pp. 1137-1140, Sep. 2016. Available: http://science.sciencemag.org/content/353/6304/1137.

Singh, A. et al., "Improved power side channel attack resistance of a 128-bit AES engine with random fast voltage dithering," in Proceedings of the IEEE European Solid State Circuits Conference, Sep. 2017, pp. 51-54.

Spiral. "Spiral dft/fft ip core generator." Webpage dated Sep. 26, 2016. Available: https://web.archive.org/web/20180926135629/http://www.spiral.net/hardware/dftgen.html.

Strobel, D. et al., "SCANDALee: A Side-ChANnel-based DisAssembLer using local electromagnetic emanations," in Proceedings of the Design, Automation Test in Europe Conference Exhibition, Mar. 2015, pp. 139-144.

* cited by examiner

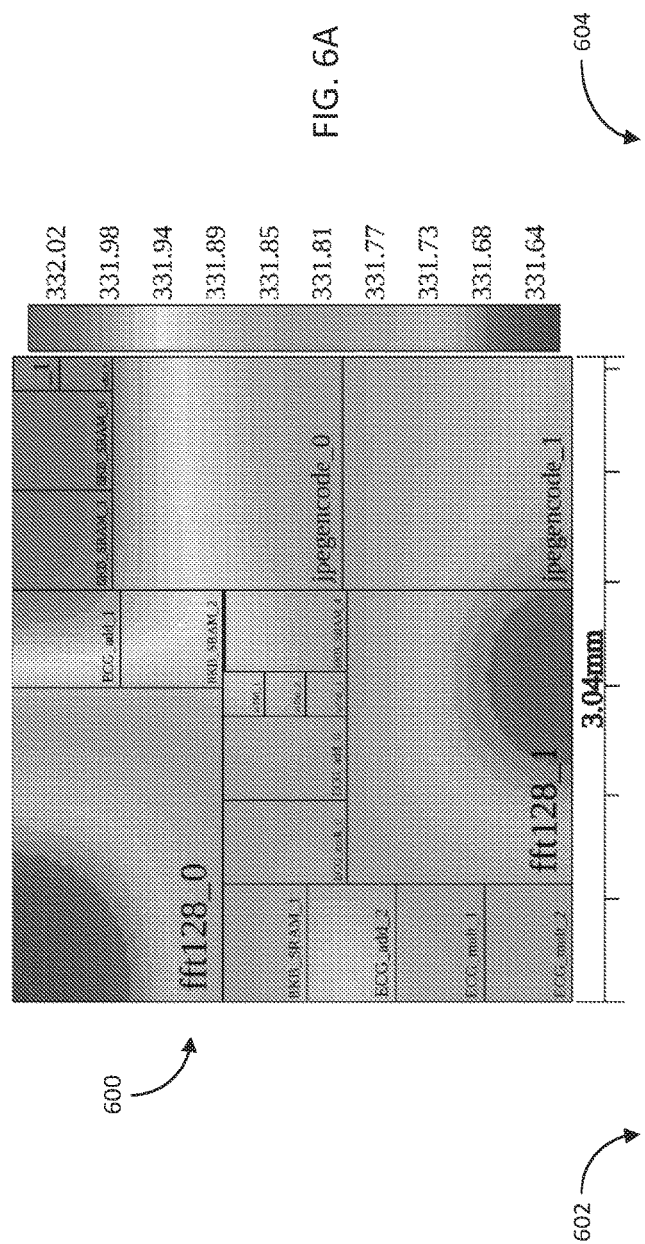
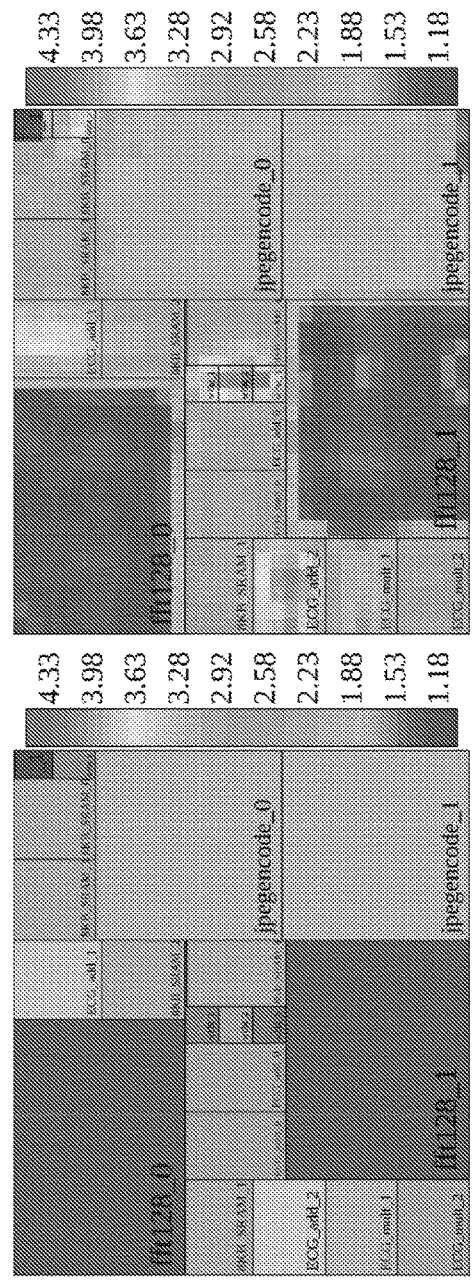
FIG. 6A
FIG. 6B
FIG. 6C

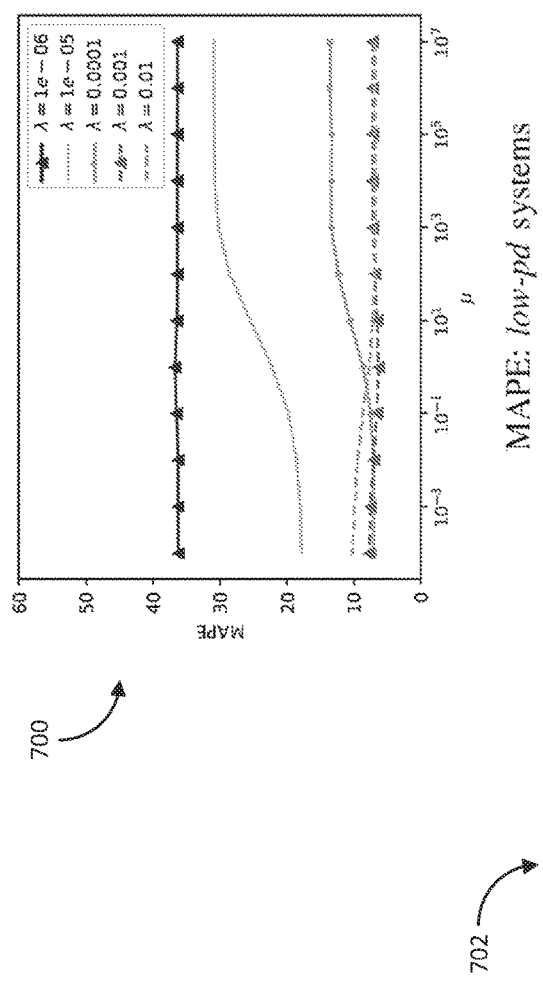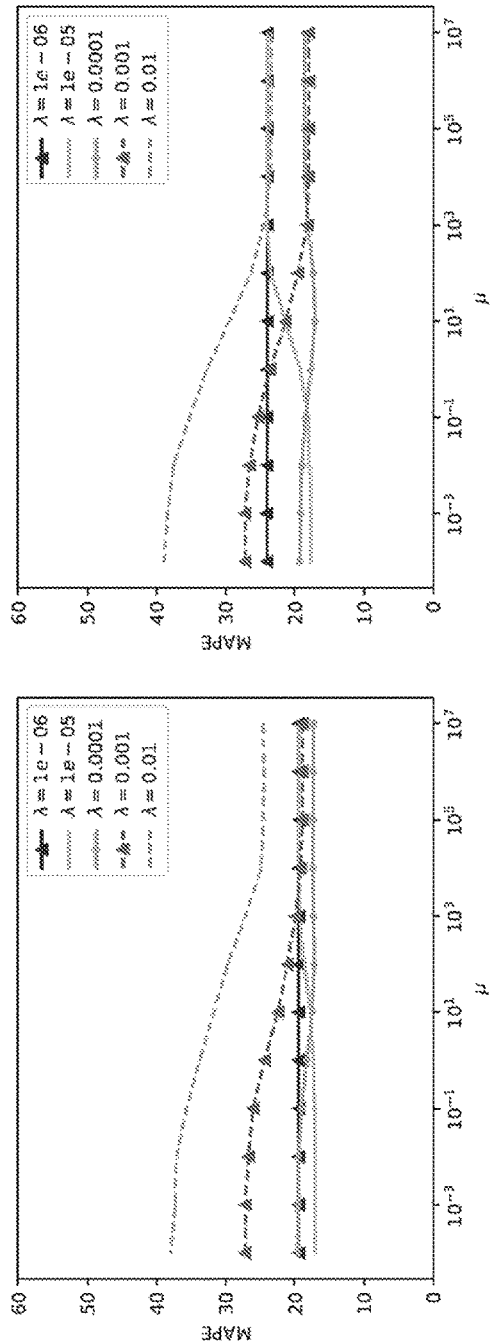
FIG. 7A
FIG. 7B
FIG. 7C

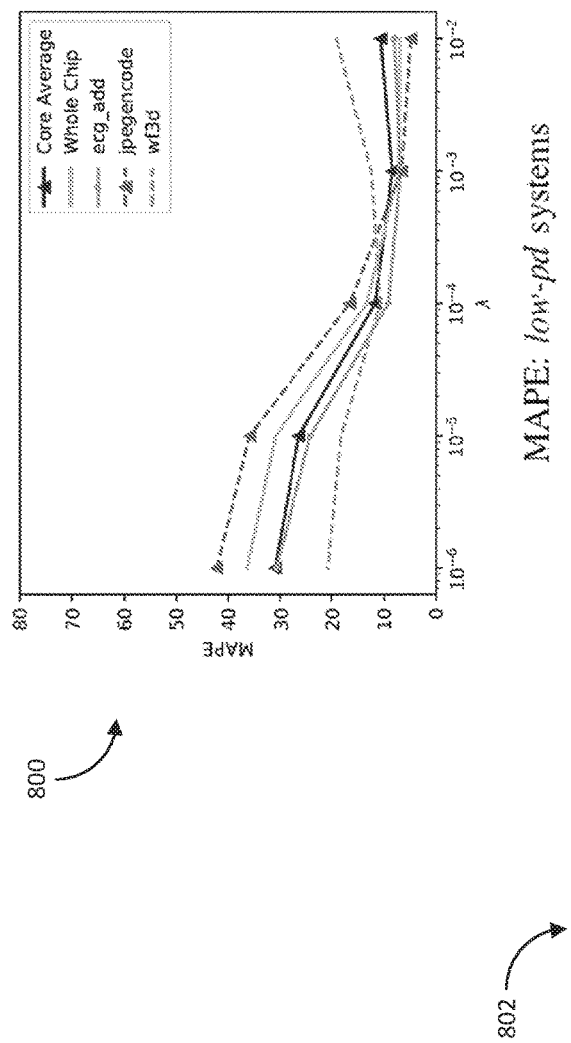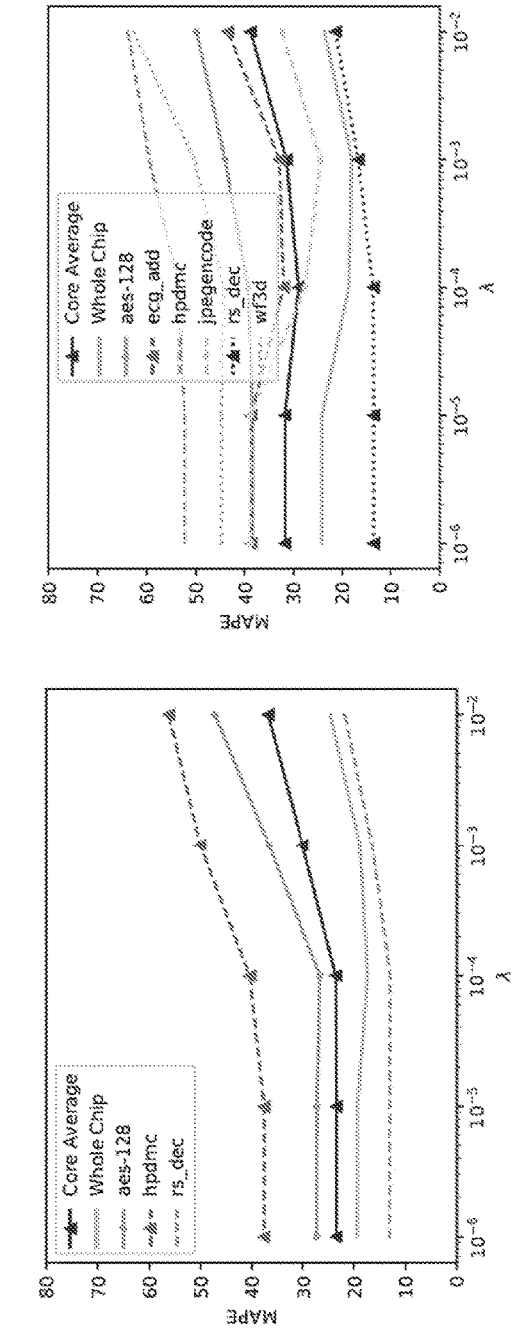
FIG. 8A
FIG. 8B MAPE: *high-pd* systems
FIG. 8C MAPE: *any-pd* systems

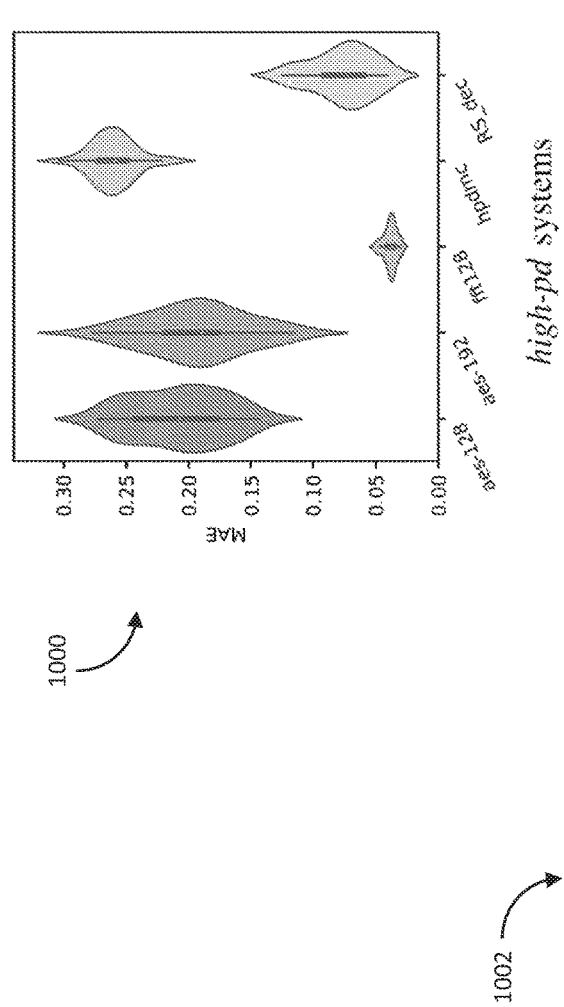
FIG. 10A
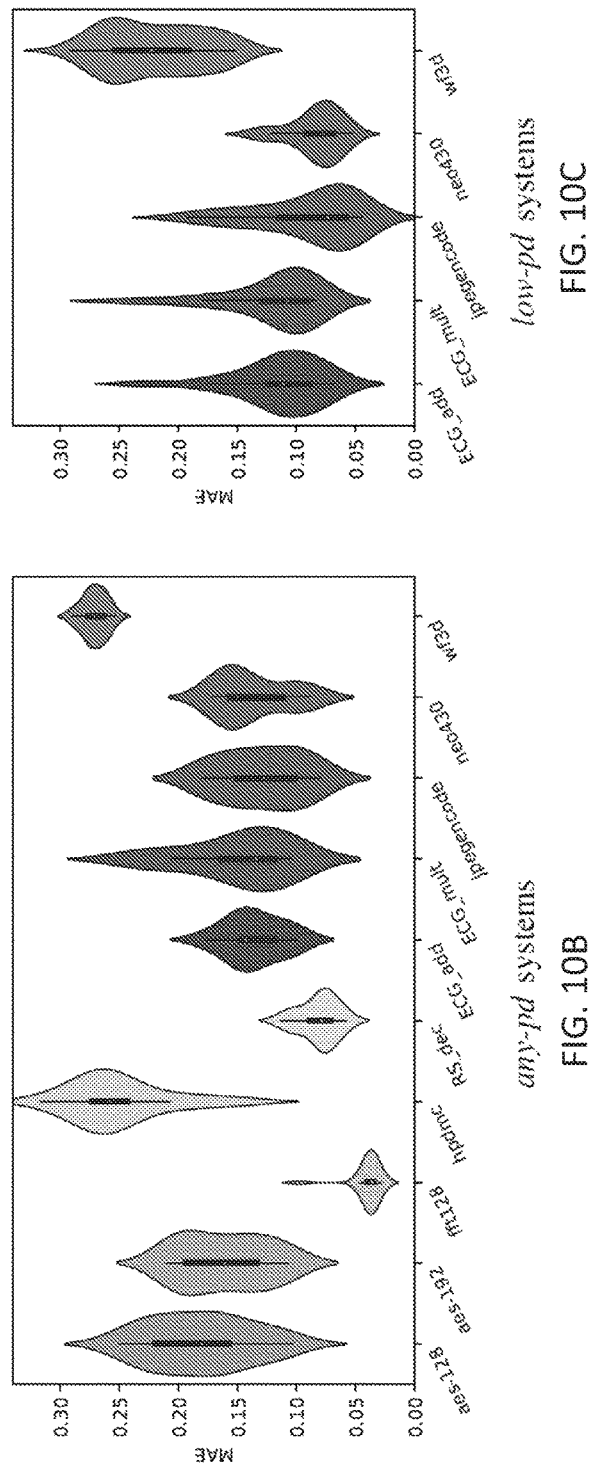
FIG. 10B
FIG. 10C

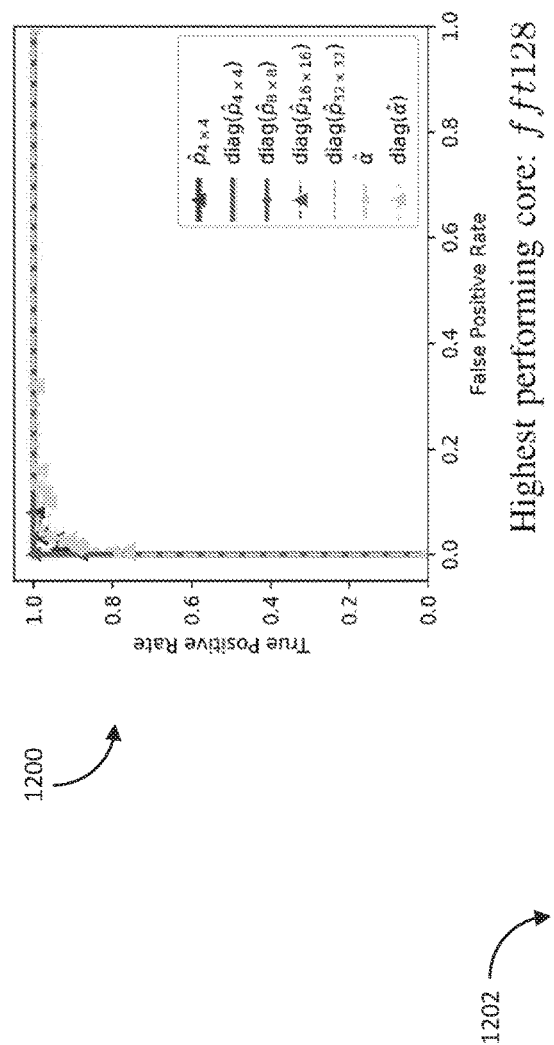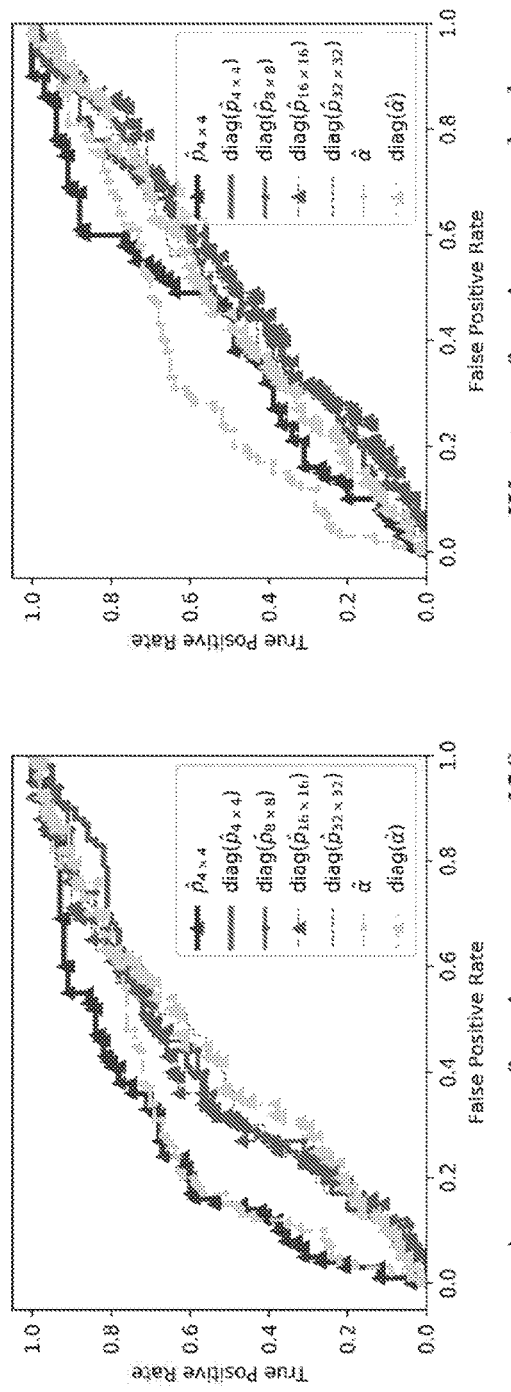
FIG. 12A — Highest performing core: $fft128$
FIG. 12B — Average performing core: $aes128$
FIG. 12C — Worst performing core: $hpdmc$

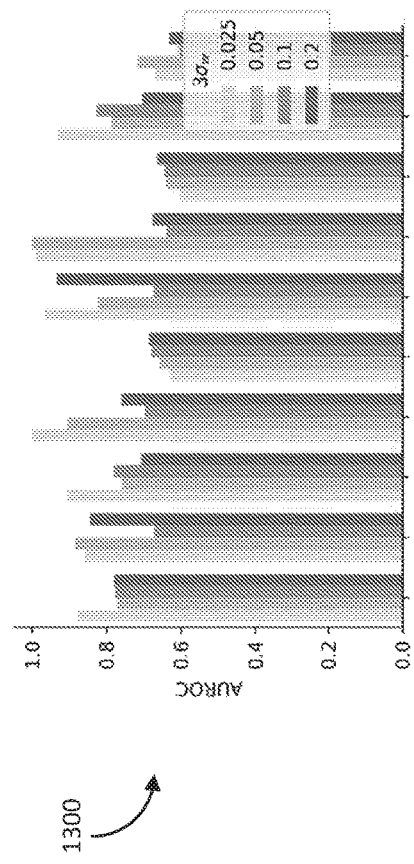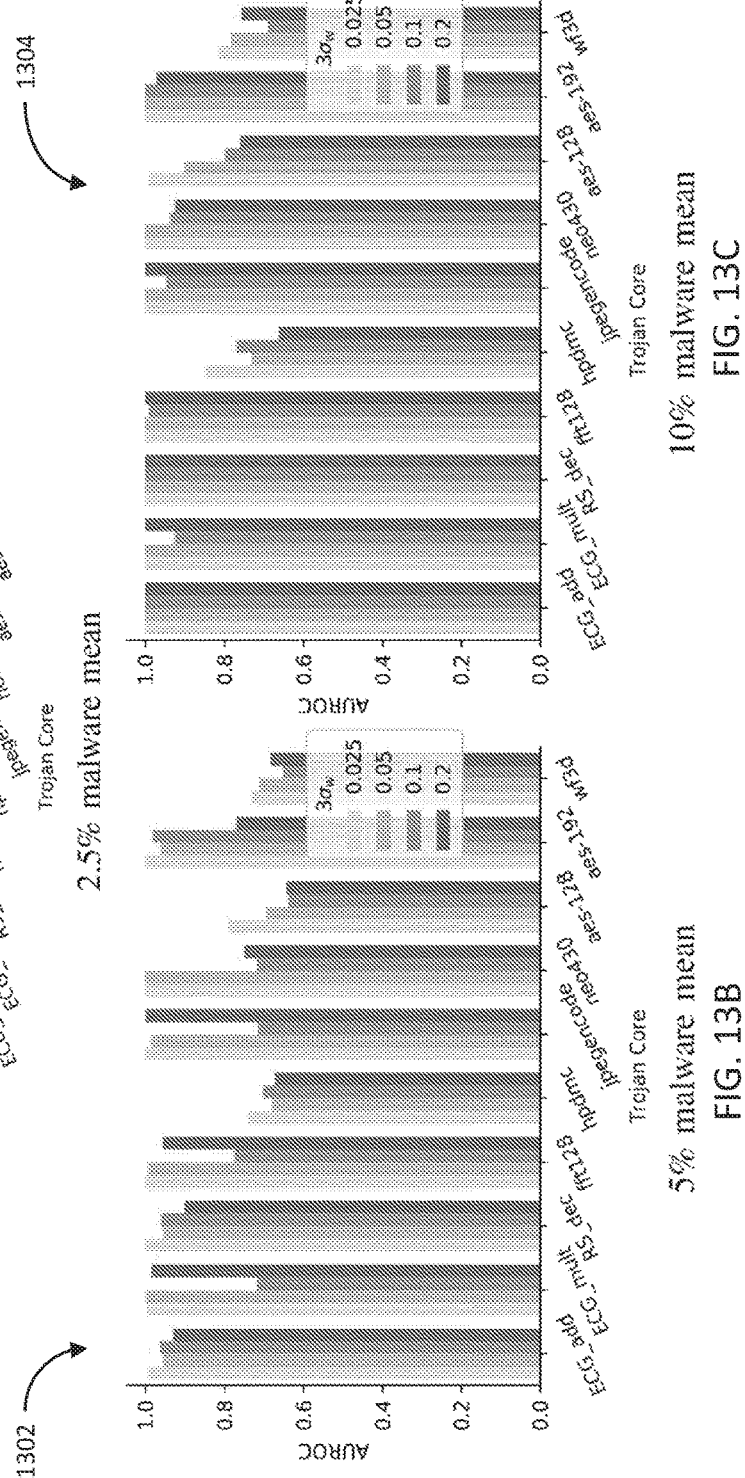
FIG. 13A
FIG. 13B
FIG. 13C

SYSTEMS AND METHODS FOR THERMAL SIDE-CHANNEL ANALYSIS AND MALWARE DETECTION

CROSS-REFERENCE TO RELATED APPLICATIONS

This application is a national stage application, filed under 35 U.S.C. § 371, which claims priority to International Patent Application PCT/US2019/055075, filed Oct. 7, 2019, which is related to, claims priority to, and is incorporated herein by its entirety for all purposes U.S. Provisional Patent Application No. 62/741,846, filed on Oct. 5, 2018.

STATEMENT REGARDING FEDERALLY FUNDED RESEARCH

This invention was made with government support under grant number NSF816 awarded by the National Science Foundation. The government has certain rights in the invention.

BACKGROUND

In computer security, a side-channel attack is an attack based on information gained from the implementation of a computer system, rather than weaknesses in the implemented algorithm itself (e.g., software bugs). Timing information, power consumption, electromagnetic leaks or even sound can provide an extra source of information, which can be exploited.

The information extracted from any given side-channel varies significantly depending on the scenario and can include information such as a private encryption key, the dynamic instruction trace of a program, or any other part of the state of the system that is not part of the ICs designed I/O interface.

As the world increasingly relies upon computer systems of increasing complexity, the available of side-channel attacks and the ramifications of side-channel attacks continues to increase.

SUMMARY

The systems and methods provided herein overcome the aforementioned drawbacks by providing new ways to detect compromised computers and computer systems and, thereby, to secure and protect computers and computer systems.

In one non-limiting example, a system is provided for the detection of malware, the system including a thermal imaging device configured to capture thermal images of an integrated circuit. The system further includes a computing device in communication with the thermal imaging device and configured to receive and transmit the thermal images via a communication network. Additionally, the system includes a server in communication with the communication network and having a processor. The processor is configured to receive the thermal images of the integrated circuit, generate a power density profile using at least one of the thermal images, compare the power density profile to an expected power density profile of the integrated circuit, and determine, based on the comparison, if the integrated circuit is in an abnormal operating state.

In some configurations, the present disclosure also provides a method for detecting malware. The method includes capturing thermal images of an integrated circuit, transmitting the thermal images via a communication network, and generating a power density profile using at least one of the thermal images. The method further includes comparing the power density profile to an expected power density profile of the integrated circuit, and determining, based on the comparison, if the integrated circuit is in an abnormal operating state.

In some configurations, the present disclosure also provides a method for detecting malware. The method includes receiving thermal images of an integrated circuit, generating an initial power density profile corresponding to the integrated circuit, and applying a regularization term to the initial power density profile. The method further includes generating an estimated power density profile corresponding to the integrated circuit, and in response to receiving a subsequent thermal image: generating a power density profile of the subsequent thermal image, comparing the power density profile to the estimated power density profile, and determining, based on the comparison, if the integrated circuit is in an abnormal operating state.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTIONS OF THE DRAWINGS

FIG. 6A is an example thermal image corresponding to a circuit topology, in accordance with the present disclosure.

FIG. 6B is an example initial power density profile corresponding to the thermal image of FIG. 6A, in accordance with the present disclosure.

FIG. 6C is an example estimated power density profile corresponding to the thermal image of FIG. 6A, in accordance with the present disclosure.

FIG. 7A is a graph of mean absolute percent error (MAPE) of low-pd systems, in accordance with the present disclosure.

FIG. 7B is a graph of MAPE of high-pd systems, in accordance with the present disclosure.

FIG. 7C is a graph of MAPE of any-pd systems, in accordance with the present disclosure.

FIG. 8A is a graph of mean absolute percent error (MAPE) of low-pd systems, in accordance with the present disclosure.

FIG. 8B is a graph of MAPE of high-pd systems, in accordance with the present disclosure.

FIG. 8C is a graph of MAPE of any-pd systems, in accordance with the present disclosure.

FIG. 10A is a graph of mean average error (MAE) of a deep neural network (DNN) for high-pd systems, in accordance with the present disclosure.

FIG. 10B is a graph of MAE of a DNN for any-pd systems, in accordance with the present disclosure.

FIG. 10C is a graph of MAE of a DNN for low-pd systems, in accordance with the present disclosure.

FIG. 12A is a graph of receiver operating characteristic (ROC) curves for an example highest performing core, in accordance with the present disclosure.

FIG. 12B is a graph of ROC curves for an example average performing core, in accordance with the present disclosure.

FIG. 12C is a graph of ROC curves for an example lowest performing core, in accordance with the present disclosure.

FIG. 13A is a graph of area under ROC (AuROC) values for a specific malware mean, in accordance with the present disclosure.

FIG. 13B is a graph of AuROC values for another specific malware mean, in accordance with the present disclosure.

FIG. 13C is a graph of AuROC values for another specific malware mean, in accordance with the present disclosure.

DETAILED DESCRIPTION

Definitions

Figure 1A:
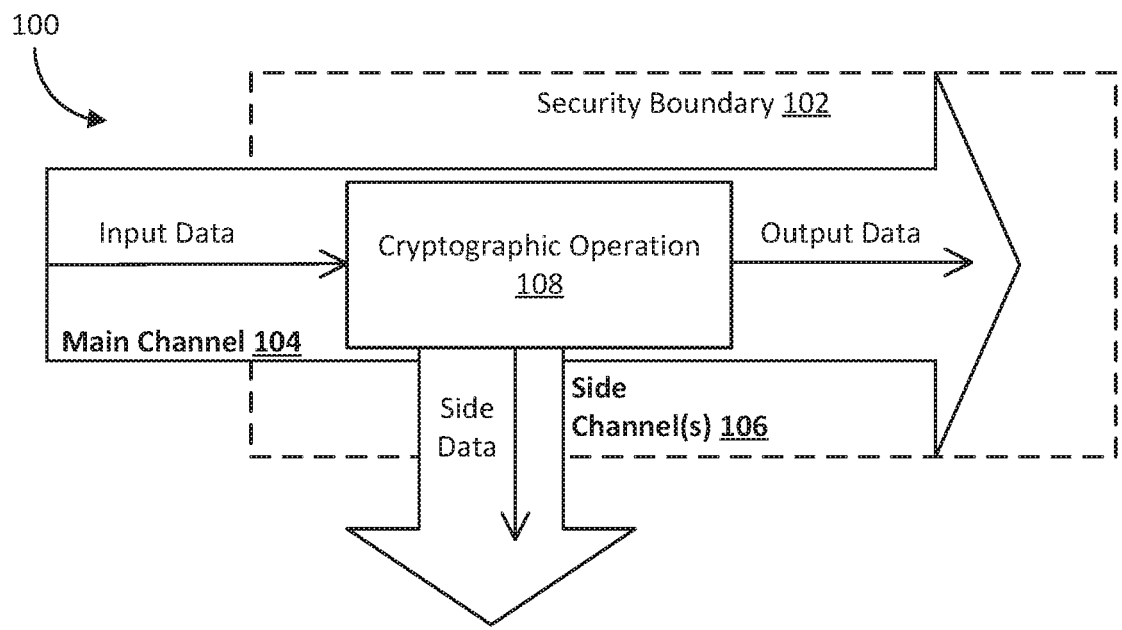
FIG. 1A is a process diagram showing an example of a side-channel, in accordance with the present disclosure.

Side-channel: as used herein, the term "side-channel" refers to an unintended source of information leakage from a computational system, computer, processor, or network or system of computers or processors. Commonly used side-channels can include electromagnetic radiation (EM), timing, and power, among others.

Core: as used herein, the term "core" refers to non-memory components of a system. As an example, fixed-function accelerators and general-purpose cores may be referred to collectively as "cores."

Activity factor: as used herein, the term "activity factor" refers to the ratio of clock cycles that a core is actively processing data from the total number of completed clock cycles.

high-pd/low-pd/any-pd: as used herein, the term "high-pd" refers to high-power-density (e.g., a high-power-density core), the term "low-pd" refers to low-power-density (e.g., a low-power-density core), and the term "any-pd" refers to any-power-density (e.g., any core, regardless of power-density). Generally, high-pd may refer to a core at or above $$10 \frac{W}{cm^2}$$

when actively consuming power. Accordingly, low-pd may refer to a core below $$10 \frac{W}{cm^2}$$

when actively consuming power. It is to be appreciated that a different threshold intensity value $$\left(\frac{W}{cm^2}\right)$$

may be used to distinguish low-pd and high-pd cores.

As indicated above, side-channels are unintended sources of information leakage. The thermal side-channel is often dismissed due to the spatial and temporal low-pass filtering of information governed by the heat diffusion equations. Electromagnetic radiation (EM) is often seen as a superior replacement for the thermal side-channel, but is prone to environmental noise and other techniques that mask the signal including both passive and active shielding.

In spite of the challenges of extracting information from the thermal side-channel, leaked information has been characterized from a variety of ICs. The thermal profiles of integrated circuits (ICs) can be leveraged as a side-channel in multiple circuit and architectural scenarios. Applications can range from identifying hardware Trojans (a malicious modification of the circuitry of an integrated circuit) to estimating the per-core power consumption of homogeneous multicore processors. Such applications leverage the correlation between the on-chip location of the consumed power with some target information of interest (e.g., correlating the extra power consumption at a specific circuit position with the presence of a hardware Trojan). While the spatial correlation between the power consumption and thermal profiles can apply to all ICs, there is a fundamental difference in the context of modern system-on-a-chip (SoCs). The difference stems from the presence of hardware accelerators, in which localized power consumption corresponds to the system performing the specific task that a given accelerator executes.

Concerns regarding high power density have led industry to incorporate specialized logic into the IC in the form of accelerators. In contrast to general-purpose multicore processors, the accelerator-rich architectures are generally heterogeneous, composed of general-purpose cores and fixed-function accelerators that perform tasks such as video encoding/decoding, encryption, or digital signal processing (DSP).

The present disclosure includes systems and methods for thermal modeling that can be implemented for even accelerator-rich architectures. Additionally, the present disclosure includes techniques that can estimate the power-consumption profile of accelerator-rich ICs. The present disclosure further includes a machine learning model, such as using a deep neural network (DNN), that can predict the activity factor of each core in an IC, based on the thermal side-channel. Additionally, the present disclosure includes systems and methods to produce statistical models that can detect malware using the activity factor estimates from the DNN, or by using the estimated power-consumption profile directly.

Figure 1B:
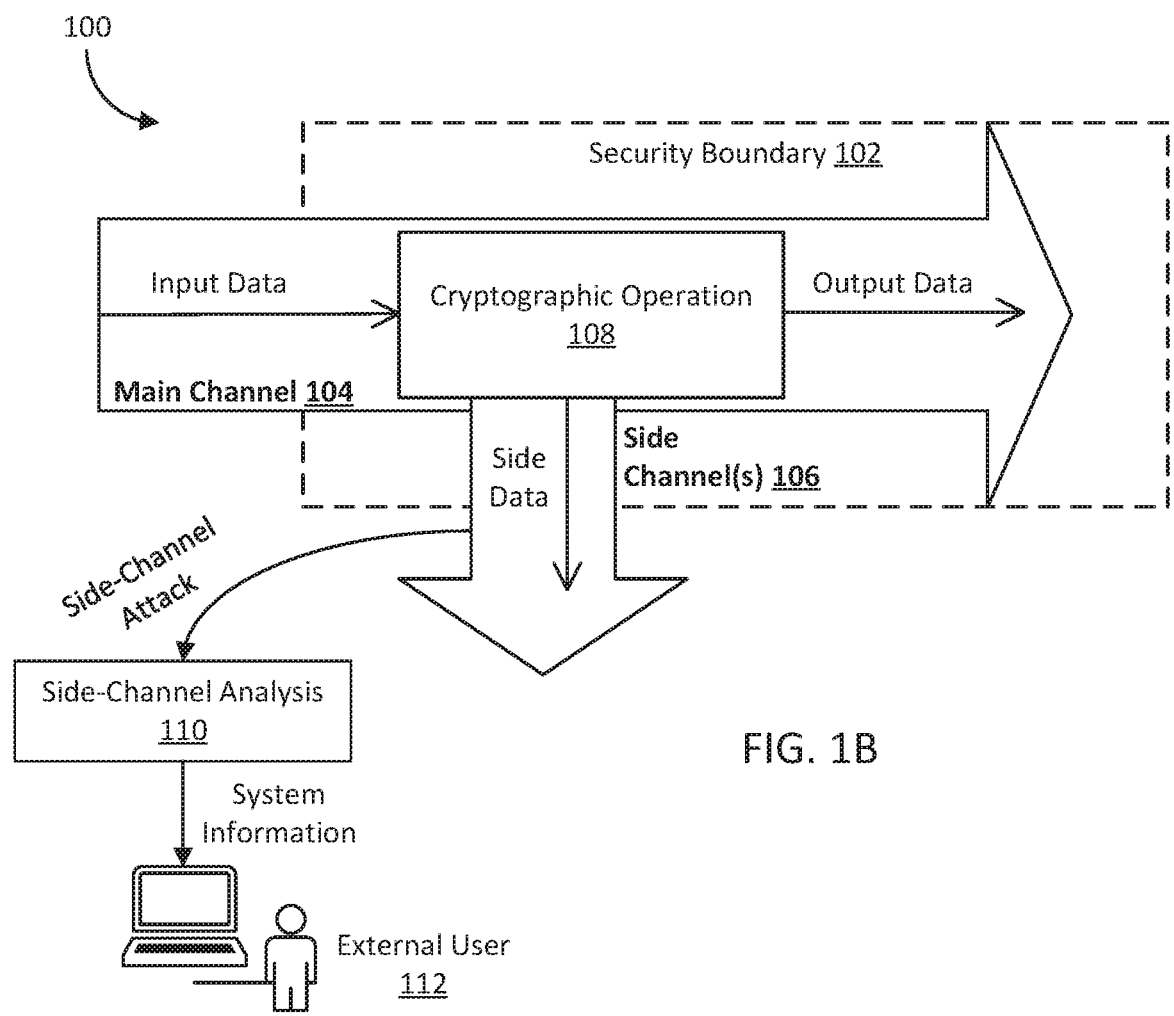
FIG. 1B is a process diagram showing an example of a side-channel attack, in accordance with the present disclosure.

Referring to FIGS. 1A-1B, an example of a side-channel is shown, in accordance with the present disclosure. In particular, FIG. 1A shows an example system 100 that illustrates side-channel(s) 106. FIG. 1B shows the example system 100 during a side-channel attack.

As shown by FIG. 1A, a main channel 104 can facilitate the transport of input data (e.g., ciphertext) across a security boundary 102. The input data can be provided to a cryptographic operation 108 (e.g., decryption) as part of the main channel 104. Subsequently, the main channel 104 can provide output data (e.g., plaintext) resulting from the cryptographic operation 108. Notably, the side-channel(s) 106 facilitate the transport of "side data" across the security boundary 102. In some aspects, the side data can include timing information, power dissipation, electromagnetic fields, and/or light. The side data can be susceptible to use and analysis by external users, which can compromise elements within the main channel 104.

As shown by FIG. 1B, a side-channel attack can use the unintended side-channel(s) 106 to exploit side data. An external user 112 can determine system information (e.g., extract a private key, reveal memory contents, generally reveal the state of the system 100) via side-channel analysis 110. As an illustrative example, the external user 112 could attempt to decode RSA key bits using power analysis (e.g., side-channel analysis 110). The CPU power variations during a step of the algorithm without multiplication can appear as relatively narrower peaks. Conversely, the CPU power variations during a step of the algorithm with multiplication can appear as relatively broader peaks. Accordingly, the external user 112 can interpret bits 0, 1 using a basic power analysis. As mentioned above, the present disclosure includes a method to produce statistical models that can detect malware (e.g., hardware Trojan horses).

Figure 2:
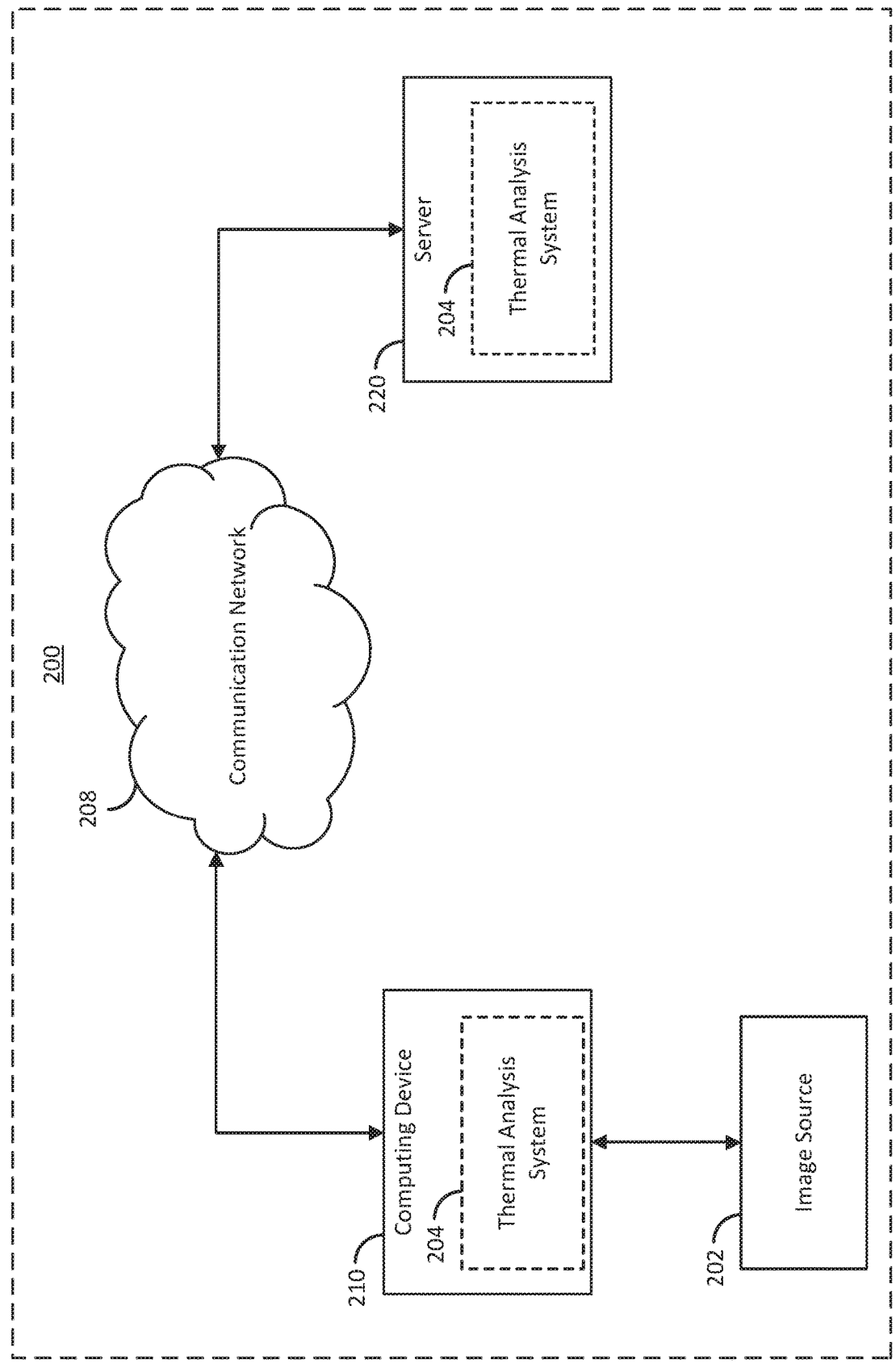
FIG. 2 is a schematic diagram of one system, in accordance with the present disclosure.

Referring now to FIG. 2, an example of a system 200 in accordance with some aspects of the disclosed subject matter is provided. As shown in FIG. 2, a computing device 210 can receive image data from an image source 202. In some configurations, the computing device 210 can execute at least a portion of a system for thermal analysis 204. That is, as described above, thermal analysis of heat maps corresponding to circuit topologies can provide desirable information.

Additionally or alternatively, in some configurations, the computing device 210 can communicate information about image data received from the image source 202 to a server 220 over a communication network 208, which can also include a version of a system for thermal analysis 204.

In some configurations, the computing device 210 and/or server 220 can be any suitable computing device or combination of devices, such as a desktop computer, a laptop computer, a smartphone, a tablet computer, a wearable computer, a server computer, a virtual machine being executed by a physical computing device, etc.

In some configurations, the image source 202 can be any suitable source of image data, such as a thermographic camera (also called an infrared camera, thermal imaging camera, or infrared thermography) that forms a heat zone image using infrared radiation, or another computing device (e.g., a server storing image data), and the like. In some configurations, the image source 202 can be local to the computing device 210. For example, the image source 202 can be incorporated with the computing device 210 (e.g., the computing device 210 can be configured as part of a device for capturing and/or storing images). As another example, the image source 202 can be connected to the computing device 210 by a cable, a direct wireless link, or the like. Additionally or alternatively, in some configurations, the image source 202 can be located locally and/or remotely from the computing device 210, and can communicate image data to the computing device 210 (and/or server 220) via a communication network (e.g., the communication network 208).

In some configurations, the communication network 208 can be any suitable communication network or combination of communication networks. For example, the communication network 208 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some configurations, the communication network 208 can be a local area network, a wide area network, a public network (e.g., the Internet), a private or semi-private network (e.g., a corporate or university intranet), other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

Figure 3:
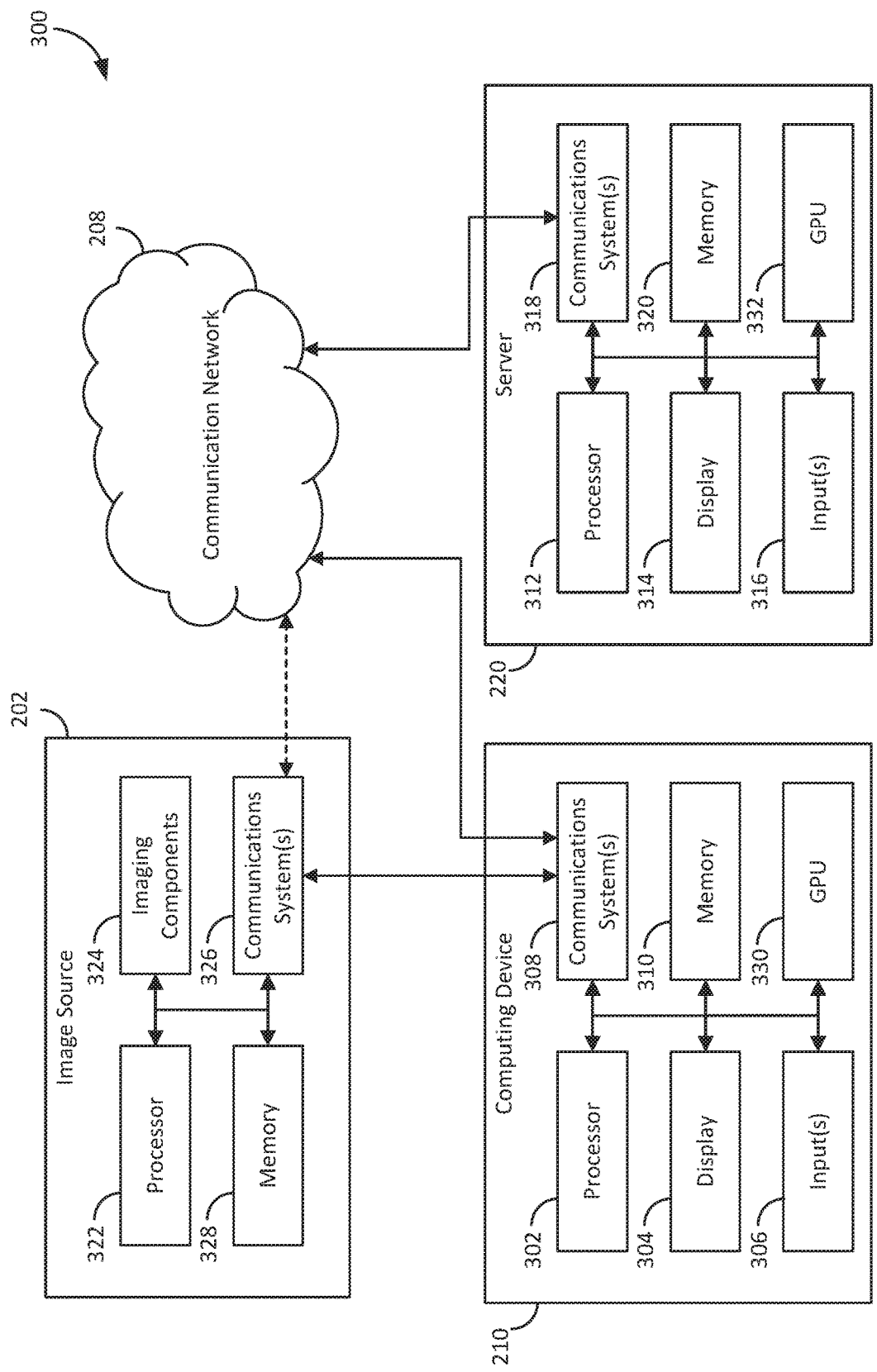
FIG. 3 is a schematic diagram showing further details of a non-limiting example of the system of FIG. 2, in accordance with the present disclosure.

FIG. 3 shows an example of hardware 300 that can be used to implement the image source 202, computing device 210, and/or server 220 in accordance with some aspects of the disclosed subject matter. As shown in FIG. 3, in some configurations, the computing device 210 can include a processor 302, a display 304, one or more inputs 306, one or more communication systems 308, memory 310, and/or a GPU 330. In some configurations, the processor 302 can be any suitable hardware processor or combination of processors, such as a central processing unit (CPU). In some configurations, the display 304 can include any suitable display devices, such as a computer monitor, a touchscreen, a television, etc. In some configurations, the inputs 306 can include any of a variety of suitable input devices and/or sensors that can be used to receive user input, such as a keyboard, a mouse, a touchscreen, a microphone, and the like.

In some configurations, the communications systems 308 can include a variety of suitable hardware, firmware, and/or software for communicating information over the communication network 208 and/or any other suitable communication networks. For example, the communications systems 308 can include one or more transceivers, one or more communication chips and/or chip sets, etc. In a more particular example, the communications systems 308 can include hardware, firmware and/or software that can be used to establish a Wi-Fi connection, a Bluetooth connection, a cellular connection, an Ethernet connection, etc.

In some configurations, the memory 310 can include any suitable storage device or devices that can be used to store instructions, values, etc., that can be used, for example, by the processor 302 to present content using the display 304, to communicate with the server 220 via the communications system(s) 308, and the like. The memory 310 can include any of a variety of suitable volatile memory, non-volatile memory, storage, or any suitable combination thereof. For example, the memory 310 can include RAM, ROM, EEPROM, one or more flash drives, one or more hard disks, one or more solid state drives, one or more optical drives, etc. In some configurations, the memory 310 can have encoded thereon a computer program for controlling operation of the computing device 210. In such configurations, the processor 302 can execute at least a portion of the computer program to present content (e.g., thermal images, user interfaces, graphics, tables, and the like), receive content from the server 220, transmit information to the server 220, and the like.

In some configurations, the server 220 can include a processor 312, a display 314, one or more inputs 316, one or more communications systems 318, memory 320, and/or GPU 332. In some configurations, the processor 312 can be a suitable hardware processor or combination of processors, such as a CPU, and the like. In some configurations, the display 314 can include a suitable display devices, such as a computer monitor, a touchscreen, a television, and the like. In some configurations, the inputs 316 can include a suitable input devices and/or sensors that can be used to receive user input, such as a keyboard, a mouse, a touchscreen, a microphone, and the like.

In some configurations, the communications systems 318 can include a suitable hardware, firmware, and/or software for communicating information over the communication network 208 and/or any other suitable communication networks. For example, the communications systems 318 can include one or more transceivers, one or more communication chips and/or chip sets, and the like. In a more particular example, the communications systems 318 can include hardware, firmware and/or software that can be used to establish a Wi-Fi connection, a Bluetooth connection, a cellular connection, an Ethernet connection, and the like.

In some configurations, the memory 320 can include any suitable storage device or devices that can be used to store instructions, values, and the like, that can be used, for example, by the processor 312 to present content using the display 314, to communicate with one or more computing devices 210, and the like. The memory 320 can include any of a variety of suitable volatile memory, non-volatile memory, storage, or any suitable combination thereof. For example, the memory 320 can include RAM, ROM, EEPROM, one or more flash drives, one or more hard disks, one or more solid state drives, one or more optical drives, and the like. In some configurations, the memory 320 can have encoded thereon a server program for controlling operation of the server 220. In such configurations, the processor 312 can execute at least a portion of the server program to transmit information and/or content (e.g., power data, thermal images, a user interface, and the like) to one or more computing devices 210, receive information and/or content from one or more computing devices 210, receive instructions from one or more devices (e.g., a personal computer, a laptop computer, a tablet computer, a smartphone, and the like), and the like.

In some configurations, the image source 202 can include a processor 322, imaging components 324, one or more communications systems 326, and/or memory 328. In some embodiments, processor 322 can be any suitable hardware processor or combination of processors, such as a CPU and the like. In some configurations, the imaging components 324 can be any suitable components to generate image data corresponding to thermal imaging.

Note that, although not shown, the image source 202 can include any suitable inputs and/or outputs. For example, the image source 202 can include input devices and/or sensors that can be used to receive user input, such as a keyboard, a mouse, a touchscreen, a microphone, a trackpad, a trackball, hardware buttons, software buttons, and the like. As another example, the image source 202 can include any suitable display devices, such as a computer monitor, a touchscreen, a television, etc., one or more speakers, and the like.

In some configurations, the communications systems 326 can include any suitable hardware, firmware, and/or software for communicating information to the computing device 210 (and, in some embodiments, over the communication network 208 and/or any other suitable communication networks). For example, the communications systems 326 can include one or more transceivers, one or more communication chips and/or chip sets, and the like. In a more particular example, the communications systems 326 can include hardware, firmware and/or software that can be used to establish a wired connection using any suitable port and/or communication standard (e.g., VGA, DVI video, USB, RS-232, and the like), Wi-Fi connection, a Bluetooth connection, a cellular connection, an Ethernet connection, and the like.

In some configurations, the memory 328 can include any suitable storage device or devices that can be used to store instructions, values, image data, and the like, that can be used, for example, by the processor 322 to: control the imaging components 324, and/or receive image data from the imaging components 324; generate images; present content (e.g., thermal images, a user interface, and the like) using a display; communicate with one or more computing devices 210; and the like. The memory 328 can include any suitable volatile memory, non-volatile memory, storage, or any of a variety of other suitable combination thereof. For example, the memory 328 can include RAM, ROM, EEPROM, one or more flash drives, one or more hard disks, one or more solid state drives, one or more optical drives, and the like. In some configurations, the memory 328 can have encoded thereon a program for controlling operation of the image source 202. In such configurations, the processor 322 can execute at least a portion of the program to generate images, transmit information and/or content (e.g., thermal image data) to one or more of the computing devices 210, receive information and/or content from one or more computing devices 210, receive instructions from one or more devices (e.g., a personal computer, a laptop computer, a tablet computer, a smartphone, and the like), and the like.

Figure 4:
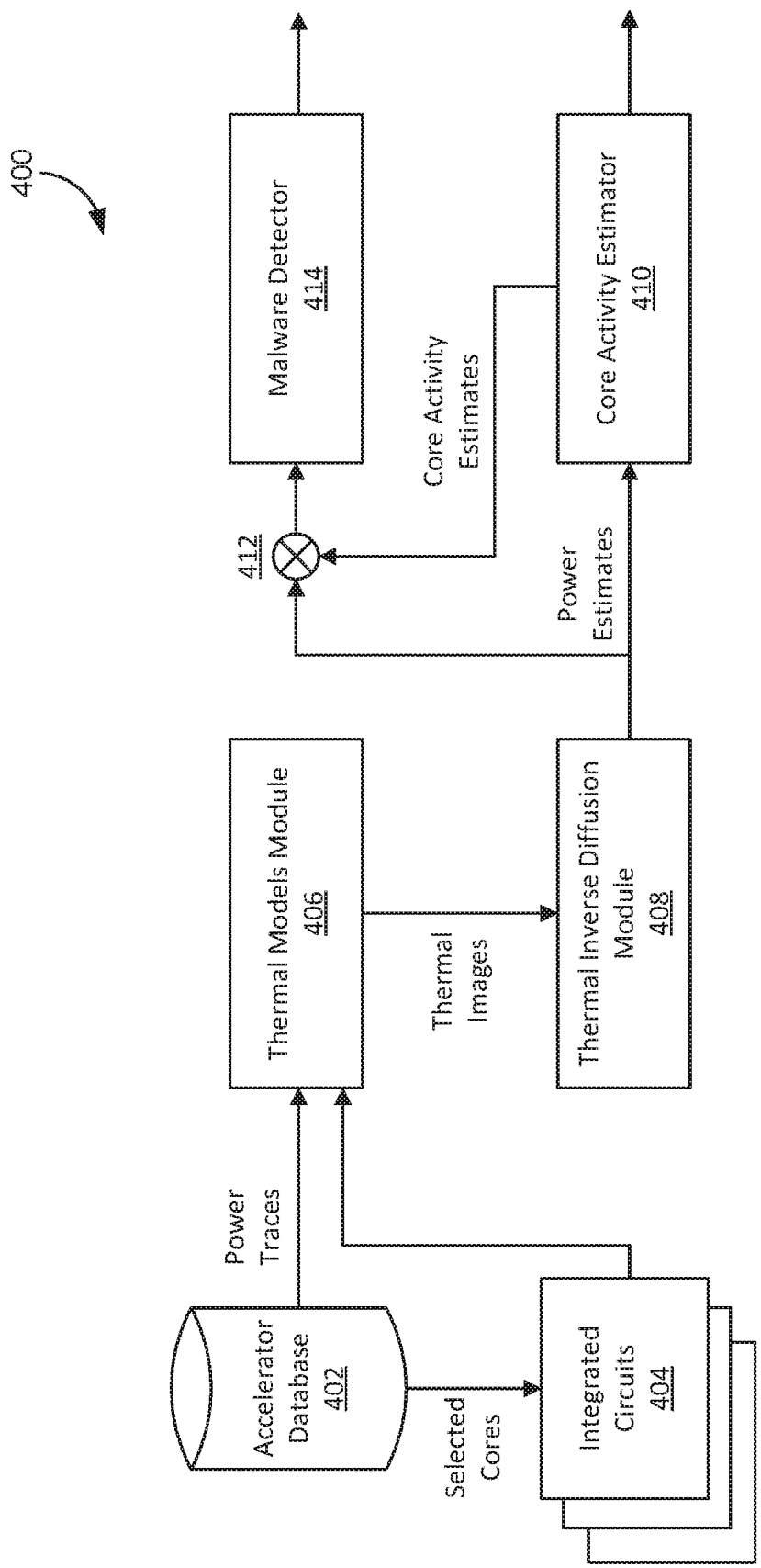
FIG. 4 is a schematic diagram showing a thermal analysis system, in accordance with the present disclosure.

Referring now to FIG. 4, a schematic diagram of one thermal analysis system 400 is shown, in accordance with some aspects of the present disclosure. In some aspects of the present disclosure, the thermal analysis system 400 can be the same or similar to the thermal analysis system 204, as shown and described with respect to FIGS. 2-3. Notably, the thermal analysis system 400 can be implemented on a computing device (e.g., the computing device 210), and/or a server (e.g., the server 220).

As shown, the thermal analysis system 400 can include an accelerator database 402, which is shown to communicate with integrated circuits 404. Additionally, the accelerator database 402 can be in communication with a thermal models module 406. According to some aspects, the accelerator database 402 can store data specific to a variety of cores. In particular, the accelerator database 402 can store core names, core powers, area, and/or timing characteristics. An example of data that can be stored within the accelerator database 402 is shown in Table 1, below.

TABLE 1

CORE POWER, AREA, AND TIMING CHARACTERISTICS
USING SAED32-RVT AT 1.16V, 25° C. THE RATIO OF
ACTIVE TO IDLE POWER IS REFERRED TO AS POWER
RATIO. SHADED ROWS INDICATE HIGH-PD CORES
AND UNSHADED ROWS INDICATE LOW-PD CORES.

| Core | Power-Density (W/cm$^2$) | | | Area (μm$^2$) | Frequency |
|---|---|---|---|---|---|
| | Active | Idle | Ratio | | |
| aes-128 | 28.4 | 2.04 | 13.94 | 17430 | 300 MHz |
| aes-192 | 27.73 | 1.91 | 14.53 | 24064 | 300 MHz |
| ECG_add | 3.90 | 1.88 | 2.08 | 230605 | 100 MHz |
| ECG_mult | 2.97 | 1.84 | 1.62 | 229642 | 70 MHz |
| fft128 | 22.62 | 1.51 | 14.94 | 1459551 | 100 MHz |
| hpdmc | 48.42 | 13.07 | 3.70 | 4248 | 700 MHz |
| jpegencode | 2.03 | 1.68 | 1.21 | 1186501 | 20 MHz |
| neo430 | 2.44 | 1.32 | 1.84 | 370573 | 50 MHz |
| RS_dec | 47.47 | 1.73 | 27.40 | 115013 | 185 MHz |
| wf3d | 4.62 | 3.71 | 1.25 | 40700 | 150 MHz |

Specific cores can be selected from the accelerator database 402 (e.g., via input(s) 306, 316), and the selected cores can be associated with integrated circuits 404. Further, as shown, the accelerator database 402 can provide power traces (graphs of electrical activity over time) corresponding to the selected cores to the thermal models module 406.

Still referring to FIG. 4, the thermal models module 406 is shown to receive power traces from the accelerator database 402, and core data from the integrated circuits 404. Additionally, the thermal models module 406 can provide thermal images to a thermal inverse diffusion module 408. When designing an IC, care is taken to avoid thermal hotspots and an unevenly distributed power density, which can cause timing errors and accelerate device wear out. In some aspects of the present disclosure, the power-density of the core can be factored in when selecting cores for a given IC (which can account for thermal hotspots). Each core can be first labeled as either high-power-density (high-pd) or low-power-density (low-pd) using $$10 \frac{W}{cm^2}$$

as a threshold when actively consuming power. Subsequently, three types of systems can be developed: systems using only high-pd cores, systems using only low-pd cores, and systems using any core regardless of power-density (any-pd). The three system configurations can accordingly model a variety of systems ranging from low-power SoCs to high power server processors.

As shown by FIG. 4, the thermal inverse diffusion module 408 can receive thermal images from the thermal models module 406. According to some aspects, the thermal inverse diffusion module 408 can provide power estimates to a core activity estimator 410 and to operator 412. The operator 412 can, for example, multiply the power estimates and the core activity estimates. As shown, the operator 412 can provide an output to a malware detector 414. The various operations of the thermal inverse diffusion module 408, the core activity estimator 410, and the malware detector 414 are described in greater detail below.

Heat transfer through thermal diffusion can be a low-pass filter both spatially and temporally. The filtering in time can be due to the combination of the thermal conductance and thermal capacitance of the IC and the surrounding materials. The spatial filter can be due to the nonzero lateral thermal conductance of the IC. The result can be a loss of the high-frequency information of the power-consumption across the IC. Specifically, the heat generated at a discrete location in the circuit can lead to increased temperatures across the rest of the die.

Prior techniques that directly analyzed the thermal images produced poor results. As an example, a trained convolutional neural network (CNN) was only able to predict whether a core was 100% or 0% active with an average accuracy of less than 60%, and many core types resulting in an accuracy of around 50%. To improve upon the technical field of thermal image analysis, the present disclosure includes an initial process that can solve the inverse of heat transfer equations. The solution to the problem can provide an estimate of the power-density profile of an IC based on a thermal image. The method can include analytical equations, and the modifications of the present disclosure, which adapt the model to accelerator-rich architectures.

Figure 5:
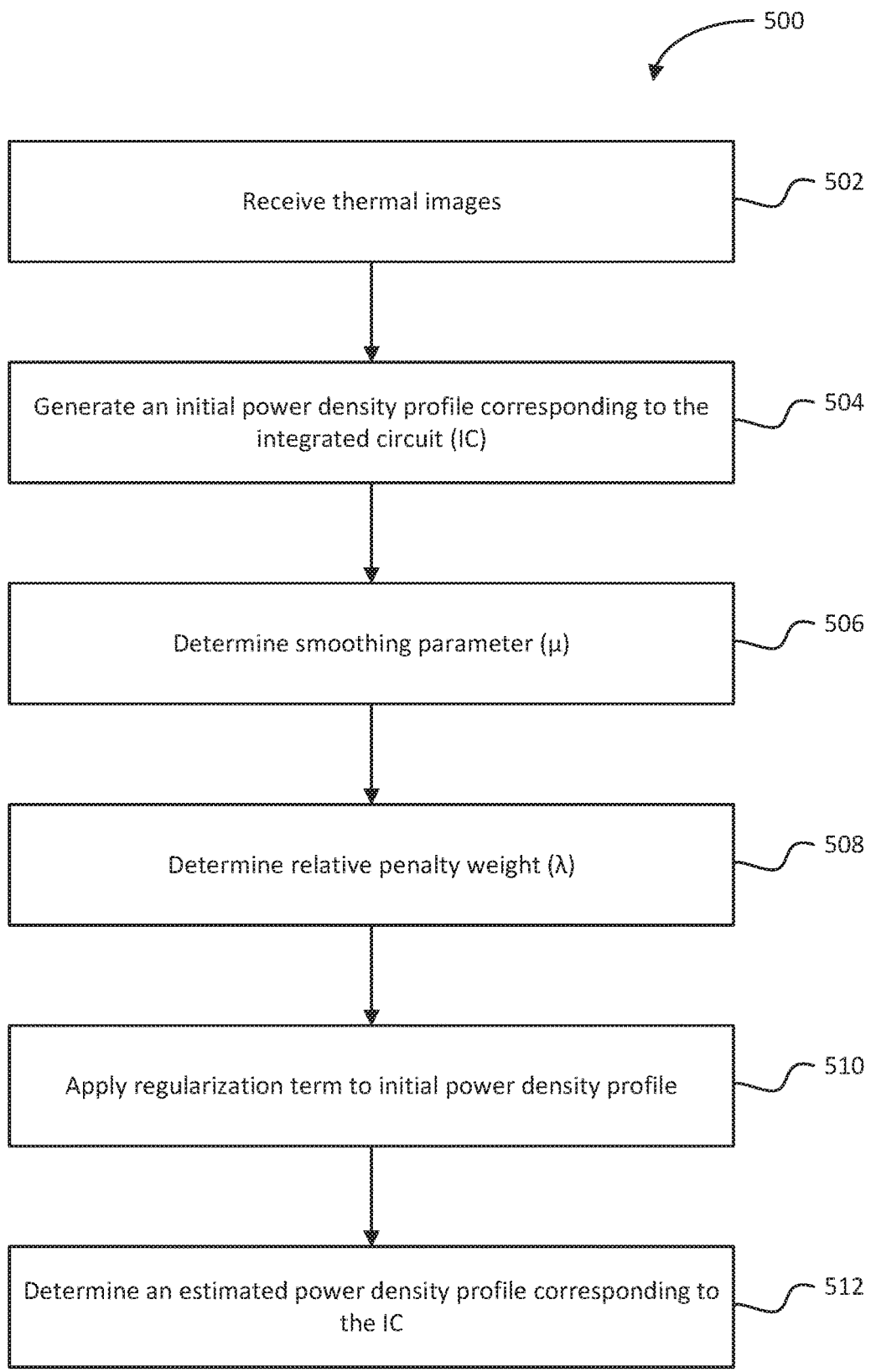
FIG. 5 is a process diagram showing a method for estimating a power density profile, in accordance with the present disclosure.

Referring now to FIG. 5, a method 500 for estimating a power density profile is shown, in accordance with the present disclosure. The method 500 can be an initial process that can solve the inverse of heat transfer equations. In some aspects, the method 500 can be implemented via the thermal inverse diffusion module 408 (e.g., within the thermal analysis system 204). The method 500 used for the initial image processing is outlined by FIG. 5.

Method 500 is shown to include receiving thermal images (process block 502). In some aspects, the thermal images can be provided from the thermal models module 406. Method 500 is shown to further include generating an initial power density profile corresponding to the integrated circuit (IC) (process block 504). Thermal simulators can apply a resistor network that functions as a discretized version of the heat equation given by:

$$Rp+e=\Delta t. \tag{1}$$

In (1), the matrix R can be the resistive network that represents the thermal resistances of the system, p can be the 2-D array of power densities, e can be all sources of error in the system, and $\Delta t$ can be a 2-D thermal image normalized to the ambient temperature. If R and p are known, $\Delta t$ can be computed by performing a matrix multiplication after assuming e is $\vec{0}$. The inverse problem—computing p given $\Delta t$—can be more difficult and requires that R is either known or can be estimated.

Estimation of R can be possible either experimentally or through simulation. For this work, R can be derived by simulation. Deriving R in this way can leverage the linearity of the model and can be achieved by first partitioning the IC into a grid of $n_1 \times n_2$ blocks. Next, each block can be activated one at a time by setting the power within the target block to some constant value and the power in the remaining blocks to 0. The thermal images produced by the impulse responses are $m_1 \times m_2$ thermal pixels and can be used as the elements of R. The values in p can correspond to the power consumption within each block. In the case where the IC is split into $n_1 \times n_2$ blocks and each thermal image is $m_1 \times m_2$ pixels, the dimensions of R are $n_1 \times n_2 \times m_1 \times m_2$. As one non-limiting example, the grid and thermal image dimensions can be chosen as: $n_1$ and $n_2$ are 128 blocks and $m_1$ and $m_2$ are 32 pixels.

Given t and R, p can be estimated by solving the optimization problem that minimizes the error term e and can be given by:

$$\hat{p} = \arg\min_{p} \|Rp - \Delta t\|_2^2. \quad (2)$$

Thus generating an initial power density profile corresponding to the integrated circuit (IC) (process block 504).

Method 500 is shown to further include determining a smoothing parameter (μ) (process block 506) and determining a relative penalty weight (λ) (process block 508). In some aspects, the smoothing parameter and the relative penalty weight can be configured as a combined regularization term. While (2) can be solved without further modification, the fact that R is an ill-conditioned matrix means that small errors in t result in large errors in p̂. The present disclosure includes a method to minimize the error in problems that are ill-conditioned, through the addition of a regularization term. The regularization term can serve many purposes, including but not limited to: reducing noise, preventing over-fitting, encouraging model sparsity, and/or leveraging assumptions that are made regarding the nature of the solution. Regularization is a feature of the present disclosure, as the performance of the models is directly affected by the quality of the power density estimates. The present disclosure proposes and demonstrates the advantages of a regularization term that simultaneously reduces noise and improves the accuracy of the estimated power map p̂.

The regularization term was developed, in part, based on an observation that the power-density of ICs with multiple discrete hardware accelerators tend to be piecewise-constant, which is due to each accelerator being physically disjoint and functionally independent from the others: Therefore, at any given time, any subset of the accelerators may be active (within thermal limits and other system limitations). The described characteristics tend to result in systems that have instantaneous power-densities that vary at the granularity of accelerators, with an overall power-density profile that is the weighted sum of the power consumption of each accelerator. A regularization term can be added that simultaneously reduces the effects of random noise and accounts for the piecewise-constant nature of the IC power profile. The method 500 is shown to further include applying the regularization term to the initial power density profile (process block 510). Additionally, the method 500 is shown to include determining an estimated power density profile corresponding to the IC (process block 512). The minimization problem using the modified cost function (e.g., the regularization term) can be given by:

$$\hat{p} = \arg\min_{p} \|Rp - \Delta t\|_2^2 + \lambda \|\nabla p\|_1. \quad (3)$$

In (3), $\nabla p$ is the gradient of p. Since p is a 2-D grid of values, $\nabla p$ is defined as the sum of the gradients in the x and y directions. Using the definition of $\nabla p$, $\|\nabla p\|_1$ is the sum of the absolute values of the gradients of p. The λ is the relative penalty weight (see, e.g., process block 508) that is tuned to produce the most desirable results in each scenario. The effect of the relative penalty term is that adjacent blocks with different power-densities are penalized, which can reduce noise and encourage piecewise-constant values in p, both of which are well suited for accelerator-rich ICs. To perform the minimization, the derivative of the penalty term is approximated using the following smoothing equation for each value $p_i \in p$, $$\nabla \lambda |p_i| = \frac{\lambda p_i}{\sqrt{p_i^2 + \mu}}, \quad (4)$$

where μ is a smoothing parameter (see, e.g., process block 506). In effect, μ sets a soft threshold for values in $\nabla p$. When a value in $\nabla p$ is below the threshold, the penalty term can be dominated by the contribution of μ, which implies that changing $p_i$ has a small effect on the value of the cost function. Conversely, when $p_i$ is greater than the soft threshold, changes in $p_i$ can result in significant changes to the value of the cost function. Given that p is measured in $$\frac{W}{cm^2}$$

and that $\nabla p$ is the difference in p between adjacent blocks, μ indirectly sets a limit for tolerable differences in power density between adjacent blocks.

Referring now to FIGS. 6A-6C, the result of using the modified cost function (e.g., including the regularization term) given by (3) is shown. In particular, FIG. 6A shows a thermal image 600 of a circuit topology. FIG. 6B shows an initial power density profile 602 corresponding to the thermal image 600 of FIG. 6A. FIG. 6C shows an estimated power density profile 604 corresponding to the thermal image of FIG. 6A, where β is set to $10^5$ and λ is set to $10^{-4}$. As shown, the low-pass filtering of the heat diffusion equation is successfully compensated for by the optimization of the cost function. In some aspects, the power-density estimate is noticeably less accurate for smaller cores (e.g., core wf3d). The lower accuracy can be due to 1) the inability to compensate for all of the filtering caused by the process of heat diffusion and 2) the edges of the cores do not perfectly align with the grid of p̂. Both affect smaller cores more than larger cores.

Choosing values for the smoothing threshold μ and the weight of the penalty term λ can be dependent on a variety of factors including, 1) the size and power density of the IC, 2) the size of each core, and 3) the target use of the power estimates. In some cases, such as evaluating the overall power profile of an IC, μ and λ can be chosen such that the error of the entire p array is minimized. In other cases, such as isolating the power consumption of a specific core, optimization of the error of the p values that correspond to the location of the specific core may be preferred.

Referring now to FIGS. 7A-8C, the optimization of μ and λ are explored by performing a parameter sweep and evaluating the quality of the power estimates in p. As an example, each set of parameter settings were evaluated on over 100 randomly selected core configurations. For each simulation, a discretized version of p was compared with p̂ using Mean Absolute Percent Error (MAPE). The metric was computed for the entire power map as well as on a per core basis, where only the pixels strictly inside a given core were considered.

The effects of μ and λ on the overall MAPE of p̂ are shown in FIGS. 7A-7C, with the error of power-density estimate p̂ for the entire IC on systems with varied power-density (pd) shown as a function of μ and λ. In particular, FIG. 7A is a graph 700 illustrating the MAPE of low-pd systems. Similarly, FIG. 7B is a graph 702 illustrating the MAPE of high-pd systems. FIG. 7C is another graph 704 illustrating the MAPE of any-pd systems.

The data series within a given graph represents a different value for $\lambda$. For low-pd systems (FIG. 7A) and when $\lambda$ is less than or equal to $10^{-5}$, the regularization term is not weighted heavily and, therefore, the desired piecewise-constant behavior is not achieved. When $\lambda$ equals 0.01, the smoothing effect dominates the cost function, resulting in a $\hat{p}$ that filters useful information instead of removing only noise as desired. Between the two edge cases, for a $\lambda$ of 0.001 for example, the optimization function performs well across all values of $\mu$ and produces the lowest overall error. Similar trends are observed from the results shown in FIGS. 7B and 7C, where a choice for $\lambda$ that is either too low or too high results in increased error.

The effect of $\lambda$ on the MAPE of cores for low-pd, high-pd, and any-pd systems is shown in FIGS. 8A-8C. In particular, FIG. 8A is a graph 800 illustrating the MAPE of low-pd systems. Similarly, FIG. 8B is a graph 802 illustrating the MAPE of high-pd systems. FIG. 8C is another graph 804 illustrating the MAPE of any-pd systems. The various plots indicate that there is no single value of $\lambda$ that works well for all cores in all types of systems. From the results shown in FIG. 8A, a $\lambda \epsilon [10^{-3}, 10^{-2}]$ produces the lowest errors for almost all cores and the IC as a whole. The wf3d core is smaller, and therefore, more negatively affected by smoothing, which results in an increase in MAPE when $\lambda$ is greater than $10^{-4}$. Similar trends are observed for other small cores including aes-128 and hpdmc.

The present disclosure includes extracting per-core information from the thermal side-channel by tuning $\mu$ and $\lambda$ such that the per-core MAPE is minimized. As previously described, there is no single set of values for $\mu$ and $\lambda$ that works optimally for all system and core types. Therefore, $\mu$ and $\lambda$ are chosen such that the MAPE is minimized as much as possible across all cores. In some situations, it may be beneficial to have $\mu$ set to $10^5$ and $\lambda$ is set to $10^{-3}$, $10^{-4}$, and $10^{-3}$ for low-pd, high-pd, and any-pd systems, respectively. Alternatively, in accordance with the present disclosure, other values of $\mu$ and $\lambda$ can be implemented.

Figure 9:
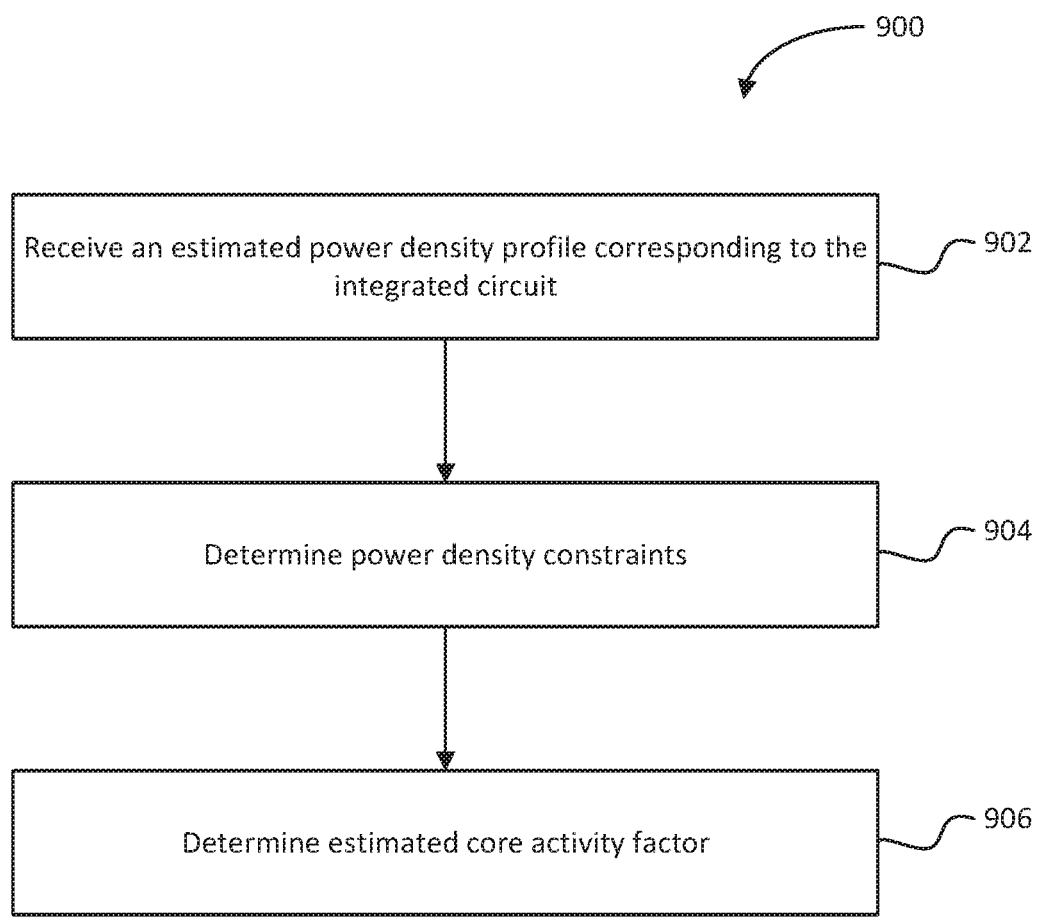
FIG. 9 is a process diagram showing a method for estimating a core activity factor, in accordance with the present disclosure.

Referring now to FIG. 9, a method 900 of estimating a core activity factor is shown, in accordance with the present disclosure. In some aspects, the method 900 can be implemented via the core activity estimator 410 (e.g., within the thermal analysis system 204). As shown, method 900 can include receiving an estimated power density profile corresponding to the IC (process block 902). In some aspects, the estimated power density profile can be provided by the thermal inverse diffusion module 408 (as described above). Additionally, method 900 is shown to include determining power density constraints (process block 904). Method 900 is shown to further include determining an estimated core activity factor (process block 906).

Within the core activity estimator 410, the thermal channel can be used to determine the activity factor of each core. The approach of the present disclosure is intentionally broad, as it can apply to a variety of attack scenarios, including reverse engineering proprietary software, being used in a timing attack, identifying if a vulnerable core is in use, and/or being used as a covert-channel.

As an illustrative example, an IoT device may be targeted and the attacker may attempt to determine the activity factor of one of more of the cores on the device. As with most IoT devices, the attacker may not have direct software access to the device, but does have physical access. In order to develop learning models, the attacker may perform characterization on device(s) on which arbitrary code is executing that sets the desired activity-factor for each core. Accordingly, the system training data can include a series of thermal images that are labeled with the activity factor of the target core(s). As an example, the number of thermal images used to develop the models may be limited to 75 since the images are manually collected by the attacker. Accordingly, additional examples were generated for model evaluation only.

The attacker may create workload components that target each of the accelerator cores present in the system, which is accomplished by repeatedly executing calls to the API of the device that leverage accelerators, such as a call that encrypts data using AES-encryption. From these components, the attacker can create a workload that activates any combination of cores on the system, thereby generating a wide range of data that is used to develop thermal and power models.

The machine learning models provided by the present disclosure may be deep neural networks (DNNs). As previously mentioned, convolutional neural networks (CNNs) were also evaluated and produced poor results due to the tendency to generalize spatially.

Continuing with the illustrative example, the attacker must also construct R in order to estimate the power profile of the IC. It is possible to construct 'impulse responses' for each core by directly and individually activating each core and collecting the corresponding thermal profiles. This, however, may prove difficult for the attacker depending on the software interface to the cores as well as any shared hardware or interdependencies between cores. Therefore, within the context of the illustrative attack, R is constructed through simulation of impulse responses of each block within a grid, which requires only basic knowledge of the IC (surface area and thickness) and the general thermal properties of silicon.

The performance of the DNN models is summarized through the results shown in FIGS. 10A-10C. In particular, the prediction quality of each model was characterized using mean average error (MAE). The data is categorized based on the type of system being evaluated and is aggregated across multiple floorplans for all of the threshold-voltages available in the SAED32 standard cell library. As shown, FIG. 10A includes a graph 1000 of the MAE for high-pd systems. Similarly, FIG. 10B includes a graph 1002 of the MAE for any-pd systems. FIG. 10C additionally includes a graph 1004 of the MAE for low-pd systems.

The two major factors that can contribute to the error in activity factor prediction of any given core are the core size and power density, which are summarized in Table 1 (shown above). The following analysis is initially limited to the results for high-pd (FIG. 10A) and low-pd (FIG. 10C) systems at first. These results are then compared with the results of any-pd systems in order to isolate the effects of varied power-density on model accuracy.

In general, models for cores that are either large or have a high active/idle power ratio have lower MAE. For example, jpegencode and RS_dec both have a MAE around 7% but have very different characteristics; the jpegencode is very large with an active/idle ratio of only 1.21, while RS_dec is 10 smaller but has a very high active/idle ratio of 27.4. The best performing models are for the fft128 core, which is slightly larger than the jpegencode core but has a much greater active/idle ratio of 14.94.

Conversely, the models that perform poorly include those that are small and have active/idle ratios close to 1. For example, the hpdmc is approximately 300×smaller than the largest core (fft128), but has a MAE of 25% despite having an active/idle ratio of 3.7. While the wf3d core is approximately 10× larger than hpdmc, the active/idle ratio is only 1.25, which results in a high MAE of 23%.

Small cores tend to have lower accuracy for the same reason that they exhibit larger MAPE in p̂, namely that heat diffusion and regularization can both filter high frequency information. Spatial low-pass filtering can also contribute to the reduced accuracy of the activity factor estimates for cores with low active/idle power ratios; the temperature of the target core can be influenced more by the higher power consumption of surrounding cores than any change in the activity factor. Such cores can also be more sensitive to error in p̂ as the signal strength is weaker. If the error in p̂ is large relative to the change in p when the core transitions from an active to an idle state, the signal to noise ratio can be lower, resulting in a decrease in accuracy of the model.

A secondary factor that can affect the error in the predicted activity-factor of a core is the overall uniformity of the power-densities of the IC. The accuracy of the models for any-pd systems (FIG. 10B) is lower for the majority of cores included in low-pd and high-pd systems only; all of the low-pd cores include approximately 5% greater error and most of the high-pd cores performed similarly or slightly worse. The two exceptions are the aes cores, which perform slightly better in any-pd systems. The likely reason is the relatively small size of the aes cores. In the high-pd systems, the activity of the aes cores can be obfuscated by the much larger and higher power fft128, whereas in the any-pd systems, the aes cores are surrounded by cores with much lower power consumption, making it easier to identify the thermal signature of aes.

As described above, the present disclosure includes systems and methods for using the thermal side-channel to detect malware. Traditional malware detection schemes operate on the same system that is being monitored, exposing the checker to the malicious software intended to be detected. Using the thermal side-channel for malware detection has the practical advantage of operating in a manner that is completely independent from the target system, removing any vulnerability.

The present disclosure models workloads that repeatedly execute on the target system. This is common in many IoT devices that continually process data, such as a security camera or a sensor node that locally performs data processing. The execution time of each core can potentially vary due to a variety of reasons including scheduling by the OS, contention for shared resources such as caches, and execution of highly variable operations like network communications. Accordingly, a "workload" may be defined such that the activity factor of each core is normally distributed around some nominal value. While the activity factors of cores in a real system are likely correlated due to contention for shared resources or inter-accelerator data dependencies, the present disclosure makes the conservative assumption that no such correlations exist, which makes anomaly detection more difficult.

The width of the distribution of the activity factor, defined as 3 standard deviations ($3\sigma$), can also vary across systems. Realtime sensor systems tend to have less variation while more complex computing platforms like those found in servers operate with more variation. In order to model the entire range of possible systems, the $3\sigma$ value for each workload can be varied over the range of 2.5% to 20%.

While malware takes countless forms, the present disclosure considers malicious activity that is repeatedly executed in order to mimic the behavior of a system that is unwittingly part of a bot-net or has been hijacked to steal compute resources to perform an undesired distributed task. Therefore, malware may be defined such that the effect on the activity factor of a single core is normally distributed around a nominal value given by $\mu_t$. The magnitude of $\mu_t$ can be varied between 2.5% and 40% to model a variety of possible malware types.

If malware is executing on a system, the impact is either to add to (increase the amount of work allotted to a given core) or subtract from (slow down a core that serves as a producer in a producer-consumer relationship) the activity factor of a core. The present disclosure considers malware affecting the activity factor of a single core within the system.

Figure 11:
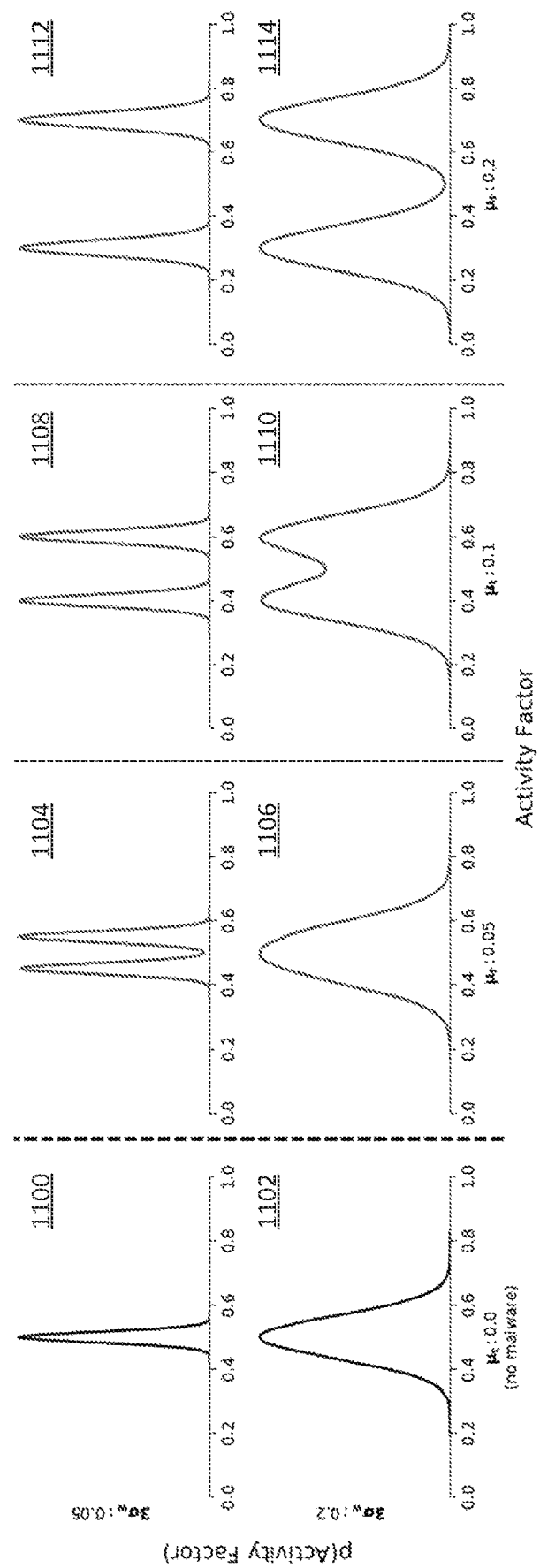
FIG. 11 is a series of graphs showing distributions of core activity factor with and without added malware, in accordance with the present disclosure.

The combined effect of $3\sigma_w$ and $\mu_t$ on the distribution of the observed activity factor for a given core is shown in FIG. 11 (see, e.g., graphs 1100, 1102, 1104, 1106, 1108, 1110, 1112, 1114). Referring to FIG. 11, each "row" includes a different workload standard deviation, indicated by the size of the three standard deviations, $3\sigma w$. Additionally, each "column" specifies the mean activity factor $\mu_t$ of the malware that is added to or substracted from the activity factors of a core. Workload mean can be statically set to 50%, as an example, and was randomly chosen for each core in the example of FIG. 11.

In the absence of malware, the activity factor of a core is normally distributed. When malware is added, the distribution can become multi-modal, with peaks above and below the original mean.

One approach to performing anomaly detection can be using parametric distributions. In cases where each sample is labeled as either "normal" or "anomalous," the labeling of a sample with an unknown class can be accomplished by $$\text{Label normal if } f(x|\Omega) > \tau \text{ else label anomaly,} \quad (5)$$

where f is the parametric model, $\Omega$ are the given parameters of the model, x is the sample being labeled, and $\tau$ is a threshold that is tuned to trade-off between the number of false positives and false negatives. One parametric model that may be used is the multivariate Gaussian, which is given by $$f(x \mid \mu, \Sigma) = \frac{1}{\sqrt{(2\pi)^d |\Sigma|}} \exp\left[\frac{-1}{2}(x-\mu)^T \Sigma^{-1} (x-\mu)\right], \quad (6)$$

where x is the observation being considered, $\mu$ is a vector containing the mean values for each feature in x, $\Sigma$ is the covariance matrix of the features in x, and d is the number of features in x. The value commonly used for $\Sigma$ can be the Maximum Likelihood Estimate (MLE), which is given by $$\Sigma_{MLE} = \frac{1}{N} \sum_{i=1}^{N} (x_i - \mu_i)(x_i - \mu_i)^T. \quad (7)$$

While the MLE estimate works well in some cases, there can be limitations. One such limitation is due to the fact that the pdf given by $f(x|\mu, \Sigma)$, contains $\Sigma^{-1}$ in the definition, requiring $\Sigma$ to be invertible. In order for $\Sigma$ to be invertible, the number of samples N must be larger than the number of features n. While N>n samples is sufficient to produce an invertible $\Sigma$, in practice, the number of observations must be much greater than the number of features (in the order of N>10n) for the resulting estimate of $\Sigma$ to be accurate. In many situations, especially in fields such as IoT, it is impractical to have more observations than features. In such cases, other techniques must be applied to accurately estimate $\Sigma$. One method is to use only the diagonal elements of the covariance matrix:

$$\hat{\Sigma} = \mathrm{diag}(\Sigma_{MLE}), \tag{8}$$

which has the advantage of working with any number of samples so long as all of the variances are non-zero.

The Receiver Operating Characteristic (ROC) curves for three selected cores in a high-pd system are shown by FIGS. 12A-12C. The True Positive Rate (TPR) corresponds to the number of times malware was correctly detected and the False Positive Rate (FPR) corresponds to the number of times the model predicted that malware was present when it was not. FIGS. 12A-12C include results that characterize all possible trade-offs between TPR and FPR made by adjusting the threshold $\tau$ in (5). Each series of each of FIGS. 12A-12C represents a model that is constructed from a different set of features; the p models are resized versions of the power-density estimates, and the Activity Factor models are generated using the predicted activity factor of all cores using the DNN models described above. The models that only include the diagonal components of the covariance matrix are denoted as 'diag'; otherwise, the fully populated covariance matrix was used.

The ROC curves indicate large variation in results based on the type of core affected by malware. Similar to the results for activity factor estimation described above, large cores with a high active/idle power ratio such as fft128 (shown in FIG. 12A) produce the highest prediction accuracy, while small cores such as hpdmc (shown in FIG. 12C), exhibit lower p prediction accuracy.

The model that produces the best ROC curve also varies from core to core. For cores like the fft128 that more significantly impact the power consumption of the IC, accurate models are produced even when down-sampled to a very low resolution of 4×4. In this case, using only the diagonal components of the covariance matrix degrades performance by filtering out important information regarding the state of each core. Conversely, smaller cores like aes128 and hpdmc are generally not affected by the resolution of $\hat{p}$, as most resolutions produced equally poor results. Instead, the biggest factor in determining the performance of the model is whether the dense covariance matrix is used or only the diagonal components are used. In both cases, lowering the resolution of $\hat{p}$ results in the loss of information. However, a better model accuracy is possible as the noise and error in the estimate of $\Sigma_{MLE}$ decreases due to having less degrees of freedom for the same number of samples.

For all three cores, the activity factor models performed comparably to that of the most optimal $\hat{p}$ model. In addition, the performance of the activity factor model does not require changes to the resolution of $\hat{p}$, whereas the $\hat{p}$ models do. If a non-optimal resolution of $\hat{p}$ is chosen, then the $\hat{p}$ model performs poorly relative to the activity factor model. In the case of hpdmc, the activity factor model is the highest performing at low FPR and only slightly outperformed by a $\hat{p}$ model at high FPR, where the model becomes unusable as it almost always predicts that malware is present even when it is not.

The activity factor models also exhibit decreased model performance when only the diagonal elements of the covariance matrix are used, which is counter-intuitive given that the actual activity factors of the cores in a system are not correlated, but demonstrates that activity factor estimates from the DNN models are. The correlation is due to the fact that $\hat{p}$ errors in one location likely result in an opposite compensatory error at a nearby location, as dictated by the solution of the heat diffusion equation. When such an error lies near the boundary of two cores, the result is the under-estimation of the activity factor of one core and the over-estimation of the other.

The Area Under ROC (AuROC) is a metric that characterizes the quality of the model that produced a given ROC curve. The metric is calculated by computing the area under the curve, which ranges from 0.0 to 1.0, with a value of 1.0 being ideal. The interdependence between workload variation ($3\sigma_w$) and the mean of the added malware distribution ($\mu_t$) is shown in FIGS. 13A-13C, where the included values are the best AuROC scores across all models for a given core. As expected, malware with a higher mean (FIG. 13C) are easier to detect for all cores relative to malware with a lower mean (FIG. 13A). Similarly, large values of $3\sigma_w$ also result in poor model performance.

More interesting trends are seen when comparing between cores. The cores that had the largest model errors in the estimates of activity factor, such as fft−128 and wf3d only begin to accurately detect the presence of malware when the mean activity factor of the malware is 10%, even when the $3\sigma_w$ is small. In contrast, for the cores that had the lowest error in the estimate of activity factor, such as RS_dec, neo430, and aes192, malware that offsets the core activity factor by only 2.5% is still detected with a high degree of accuracy when the $3\sigma_w$ is small. As $3\sigma_w$ increases, the model is limited by the overlap between the activity factor distributions, as shown in FIG. 11. The trend poses a potential limit to the accuracy of any model, even if the activity factor of each core is known precisely. Therefore, the overall performance of the model is a combination of the accuracy of the estimated activity factor and the relative size of $\mu_t$ and $3\sigma_w$.

Figure 14:
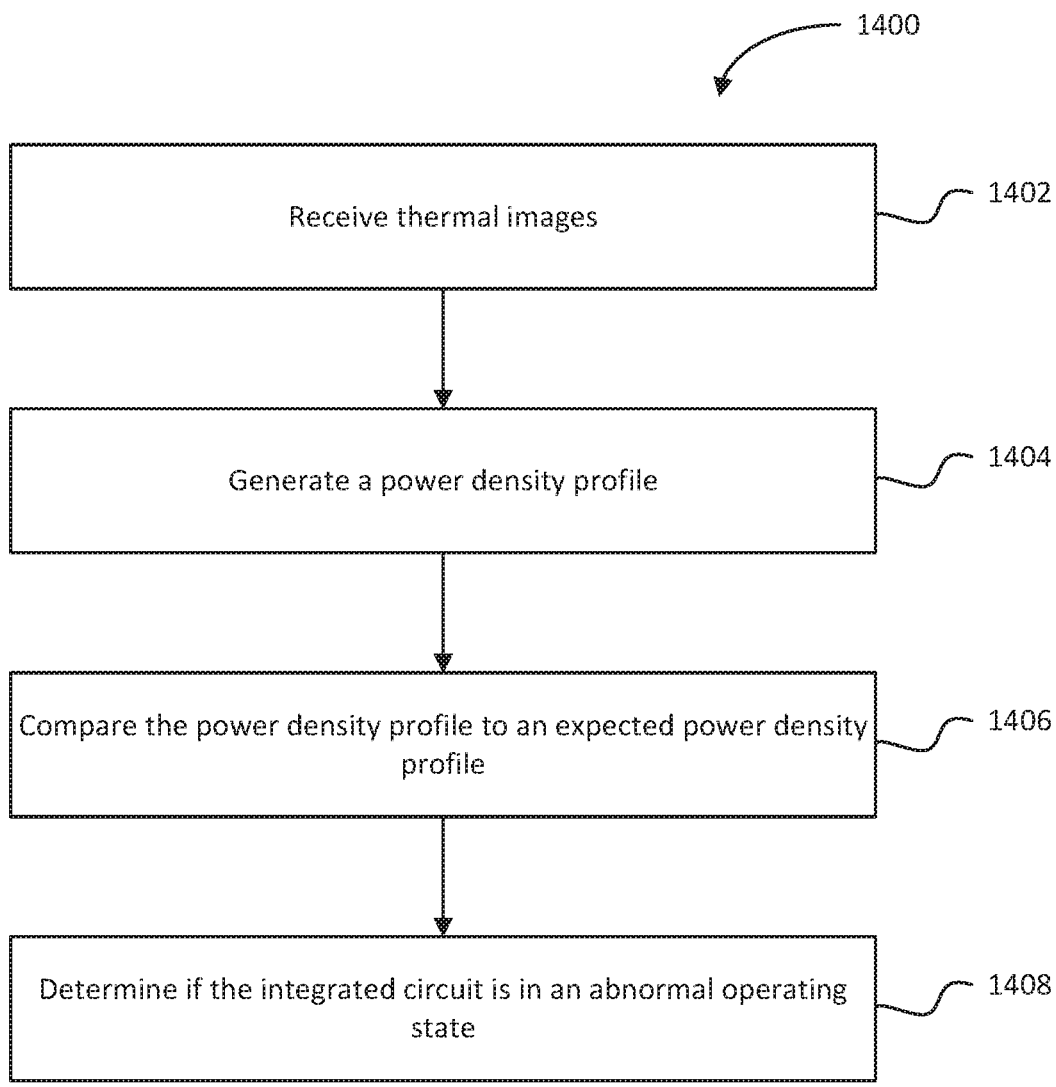
FIG. 14 is a process diagram showing a method for detecting malware, in accordance with the present disclosure.

Referring now to FIG. 14, a method 1400 for detecting malware, in accordance with the present disclosure is shown via a process diagram. As shown, the method 1400 includes receiving thermal images (process block 1402). The thermal images can correspond to an integrated circuit, according to some aspects. The method 1400 further includes generating a power density profile (process block 1404). The power density profile can correspond to the integrated circuit, and can be generated from the thermal images, according to some aspects. Additionally, the method 1400 can include comparing the power density profile to an expected power density profile (process block 1406). As shown, the method 1400 can further include determining if the integrated circuit is in an abnormal operating state (process block 1408). In some aspects, the abnormal operating state can correspond to malware (e.g., a side-channel attack). Determining if the integrated circuit is in an abnormal operating state can occur via the comparison (process block 1406).

The present disclosure includes an approach to solving the thermal inverse diffusion problem. In particular, the approach is focused on accelerator-rich ICs. The technique was shown to increase the accuracy of power-density estimates and reduce noise. The analysis of the optimal values for the hyperparameters of the model, specifically p and A, demonstrated that there is not a single optimal set of parameters, but rather, there is a tradeoff between the accuracy of the estimates for different cores and the IC as a whole.

Given the power density estimates, models that extract information from the thermal side-channel are disclosed. A DNN can be trained to predict the activity factor of each core without requiring any floorplan knowledge, and can achieved a Mean Average Error ranging from 3% to 5% for the highest performing core on a variety of system types.

Additionally, the present disclosure includes systems and methods for detecting malware through analysis of the thermal side-channel using a statistical model. The model was evaluated using the power-density estimates directly, as well as using the activity factor estimates produced by the developed DNN model. The effects of using diagonalization as a form of regularization were evaluated and shown to improve the AuROC score of the model at times, but not in all cases, motivating either model selection or the use of more advanced regularization techniques, as an example.

The present disclosure has described one or more preferred embodiments, and it should be appreciated that many equivalents, alternatives, variations, and modifications, aside from those expressly stated, are possible and within the scope of the invention.

We claim:

1. A system for the detection of malware, the system comprising:
   a thermal imaging device configured to capture thermal images of an integrated circuit;
   a computing device in communication with the thermal imaging device and configured to receive and transmit the thermal images via a communication network; and
   a server in communication with the communication network and having a processor configured to:
      receive the thermal images of the integrated circuit;
      generate a power density profile using at least one of the thermal images, wherein the power density profile is indicative of power consumptions associated with multiple accelerators of the integrated circuit;
      compare the power density profile to an expected power density profile of the integrated circuit; and
      determine, based on the comparison, if the integrated circuit is in an abnormal operating state.

2. The system of claim 1, the processor further configured to generate a malware alert in response to the integrated circuit being in the abnormal operating state.

3. The system of claim 2, further comprising a display in communication with the processor, the display configured to output the malware alert.

4. The system of claim 1, wherein the communication network is unable to communicate directly with the integrated circuit.

5. The system of claim 1, wherein the abnormal operating state is defined as a threshold level of variance between the power density profile and the expected power density profile.

6. The system of claim 1, wherein the thermal imaging device is configured to capture the thermal images in response to a trigger event corresponding to a change in a measured value of the integrated circuit.

7. The system of claim 1, wherein the power density profile comprises a weighted sum of the power consumptions associated with the multiple accelerators of the integrated circuit.

8. The system of claim 1, wherein the processor is further configured to, in response to the integrated circuit being in the abnormal operating state:
   generate a malware alert; and
   provide a push notification corresponding to the malware alert to an authorized user device.

9. The system of claim 1, wherein the abnormal operating state corresponds to a side-channel attack.

10. The system of claim 9, wherein the side-channel attack involves a thermal side-channel of the integrated circuit.

11. The system of claim 10, wherein the thermal side-channel of the integrated circuit is compromised by a hardware Trojan horse or a bot-net.

12. A method for detecting malware, the method comprising:
    receiving thermal images of an integrated circuit;
    generating a power density profile using at least one of the thermal images, wherein the power density profile is indicative of power consumptions associated with multiple accelerators of the integrated circuit;
    comparing the power density profile to an expected power density profile of the integrated circuit; and
    determining, based on the comparison, if the integrated circuit is in an abnormal operating state.

13. The method of claim 12, wherein the step of comparing further comprises determining if a threshold level of variance between the power density profile and the expected power density profile is met or exceeded.

14. The method of claim 12, further comprising:
    capturing the thermal images in response to a trigger event; and
    measuring a power value of the integrated circuit, the trigger event corresponding to a change in the power value.

15. The method of claim 12, wherein the abnormal operating state corresponds to a side-channel attack involving a thermal side-channel of the integrated circuit.

16. A method for detecting malware, the method comprising:
    receiving thermal images of an integrated circuit;
    generating an initial power density profile corresponding to the integrated circuit using at least one of the thermal images of the integrated circuit, wherein the initial power density profile is indicative of power consumptions associated with multiple accelerators of the integrated circuit;
    applying a regularization term to the initial power density profile;
    generating an estimated power density profile corresponding to the integrated circuit; and
    in response to receiving a subsequent thermal image:
       generating a power density profile of the subsequent thermal image;
       comparing the power density profile to the estimated power density profile; and
       determining, based on the comparison, if the integrated circuit is in an abnormal operating state.

17. The method of claim 16, further comprising generating the regularization term:

$$\lambda \|\nabla p\|_1,$$

where $\nabla p$ is the gradient of p, a 2-D grid of values, $\nabla p$ defined as the sum of the gradients in the x and y directions;
$\|\nabla p\|_1$ is the sum of the absolute values of the gradients of p; and
$\lambda$ is a relative penalty weight, selected based on the initial power density profile.

18. The method of claim 17, wherein the step of comparing further comprises determining if a threshold level of variance between the power density profile and the estimated power density profile is met or exceeded.

19. The method of claim 17, further comprising training a machine learning model to compare the power density profile to the estimated power density profile, the training comprising providing a plurality of thermal images with known characteristics to a machine learning algorithm.

20. The method of claim 17, wherein the abnormal operating state corresponds to a side-channel attack involving a thermal side-channel of the integrated circuit.

* * * * *

UNITED STATES PATENT AND TRADEMARK OFFICE
CERTIFICATE OF CORRECTION

| | |
|---|---|
| PATENT NO. | : 11,880,463 B2 |
| APPLICATION NO. | : 17/250973 |
| DATED | : January 23, 2024 |
| INVENTOR(S) | : Mark Hempstead et al. |

It is certified that error appears in the above-identified patent and that said Letters Patent is hereby corrected as shown below:

On the Title Page

Item (72) In the Inventors:
"Ioannis Savadis" should be -- Ioannis Savidis --

In the Claims

Claim 17, Column 20, Line 56:
"$\lambda \parallel \nabla p \parallel 1$," should be -- $\lambda \parallel \nabla p \parallel 1$- --

Signed and Sealed this
Ninth Day of April, 2024

Katherine Kelly Vidal
*Director of the United States Patent and Trademark Office*